(12) United States Patent
Duke et al.

(10) Patent No.: US 9,231,979 B2
(45) Date of Patent: Jan. 5, 2016

(54) RULE OPTIMIZATION FOR CLASSIFICATION AND DETECTION

(71) Applicant: SAS Institute Inc., Cary, NC (US)

(72) Inventors: Brian Lee Duke, Poway, CA (US);
Vijay S. Desai, San Diego, CA (US);
Paul C. Dulany, San Diego, CA (US);
Kannan Shashank Shah, San Diego, CA (US)

(73) Assignee: SAS INSTITUTE INC., Cary, NC (US)

( * ) Notice: Subject to any disclaimer, the term of this patent is extended or adjusted under 35 U.S.C. 154(b) by 7 days.

(21) Appl. No.: 14/210,314

(22) Filed: Mar. 13, 2014

(65) Prior Publication Data

US 2014/0282856 A1    Sep. 18, 2014

Related U.S. Application Data

(60) Provisional application No. 61/782,070, filed on Mar. 14, 2013.

(51) Int. Cl.
*H04L 29/06* (2006.01)

(52) U.S. Cl.
CPC ...................................... *H04L 63/20* (2013.01)

(58) Field of Classification Search
USPC .............................................................. 726/1
See application file for complete search history.

(56) References Cited

U.S. PATENT DOCUMENTS

| | | | |
|---|---|---|---|
| 5,335,291 A | 8/1994 | Kramer et al. | |
| 5,500,513 A | 3/1996 | Langhans et al. | |
| 5,519,319 A | 5/1996 | Smith et al. | |
| 5,650,722 A | 7/1997 | Smith et al. | |
| 5,675,253 A | 10/1997 | Smith et al. | |
| 5,677,955 A | 10/1997 | Doggett et al. | |
| 5,761,442 A | 6/1998 | Barr et al. | |
| 5,819,226 A | 10/1998 | Gopinathan et al. | |
| 5,884,289 A | 3/1999 | Anderson et al. | |
| 5,903,830 A | 5/1999 | Joao et al. | |
| 5,999,596 A | 12/1999 | Walker et al. | |
| 6,021,943 A | 2/2000 | Chastain | |
| 6,029,154 A | 2/2000 | Pettitt | |
| 6,047,268 A | 4/2000 | Bartoli et al. | |

(Continued)

OTHER PUBLICATIONS

Selecting Fuzzy If-Then Rules for Classification Problems|http://ieeexplore.ieee.org/stamp/stamp.jsp?tp=&arnumber=413232|Ishibuchi et al.|1995|pp. 260-270.*

(Continued)

*Primary Examiner* — Mahfuzur Rahman
(74) *Attorney, Agent, or Firm* — Kilpatrick Townsend & Stockton, LLP

(57) ABSTRACT

This disclosure describes methods, systems, and computer-program products for determining classification rules to use within a fraud detection system The classification rules are determined by accessing distributional data representing a distribution of historical transactional events over a multivariate observational sample space defined with respect to multiple transactional variables. Each of the transactional events is represented by data with respect to each of the variables, and the distributional data is organized with respect to multi-dimensional subspaces of the sample space. A classification rule that references at least one of the subspaces is accessed, and the rule is modified using local optimization applied using the distributional data. A pending transaction is classified based on the modified classification rule and the transactional data.

30 Claims, 14 Drawing Sheets

(56) References Cited

U.S. PATENT DOCUMENTS

| | | | |
|---|---|---|---|
| 6,064,990 A | 5/2000 | Goldsmith | |
| 6,122,624 A | 9/2000 | Tetro et al. | |
| 6,125,349 A | 9/2000 | Maher | |
| 6,128,602 A | 10/2000 | Northington et al. | |
| 6,170,744 B1 | 1/2001 | Lee et al. | |
| 6,330,546 B1 | 12/2001 | Gopinathan et al. | |
| 6,360,326 B1 | 3/2002 | Hiles | |
| 6,388,592 B1 | 5/2002 | Natarajan | |
| 6,401,198 B1 | 6/2002 | Harmer et al. | |
| 6,422,462 B1 | 7/2002 | Cohen | |
| 6,453,206 B1 | 9/2002 | Soraghan et al. | |
| 6,516,056 B1 | 2/2003 | Justice et al. | |
| 6,549,861 B1 | 4/2003 | Mark et al. | |
| 6,601,049 B1 | 7/2003 | Cooper | |
| 6,631,212 B1 | 10/2003 | Luo et al. | |
| 6,640,215 B1 | 10/2003 | Galperin et al. | |
| 6,650,779 B2 | 11/2003 | Vachtesvanos et al. | |
| 6,675,145 B1 | 1/2004 | Yehia et al. | |
| 6,678,640 B2 | 1/2004 | Ishida et al. | |
| 6,714,918 B2 | 3/2004 | Hillmer et al. | |
| 6,901,398 B1 | 5/2005 | Horvitz et al. | |
| 6,952,682 B1 | 10/2005 | Wellman | |
| 7,117,191 B2 | 10/2006 | Gavan et al. | |
| 7,191,150 B1 | 3/2007 | Shao et al. | |
| 7,269,516 B2 | 9/2007 | Brunner et al. | |
| 7,376,618 B1* | 5/2008 | Anderson et al. | 705/38 |
| 7,403,922 B1 | 7/2008 | Lewis et al. | |
| 7,455,226 B1 | 11/2008 | Hammond et al. | |
| 7,461,048 B2 | 12/2008 | Teverovskiy et al. | |
| 7,467,119 B2 | 12/2008 | Saidi et al. | |
| 7,480,640 B1 | 1/2009 | Elad et al. | |
| 7,536,348 B2 | 5/2009 | Shao et al. | |
| 7,562,058 B2 | 7/2009 | Pinto et al. | |
| 7,580,798 B2 | 8/2009 | Brunner et al. | |
| 7,761,379 B2 | 7/2010 | Zoldi et al. | |
| 7,765,148 B2 | 7/2010 | German et al. | |
| 7,788,195 B1 | 8/2010 | Subramanian et al. | |
| 7,912,773 B1 | 3/2011 | Subramanian et al. | |
| 8,032,448 B2* | 10/2011 | Anderson et al. | 705/38 |
| 8,346,691 B1 | 1/2013 | Subramanian et al. | |
| 8,775,231 B1* | 7/2014 | Nipko et al. | 705/7.33 |
| 8,843,395 B2* | 9/2014 | Ramer et al. | 705/14.64 |
| 8,890,676 B1 | 11/2014 | Heath | |
| 2001/0056379 A1 | 12/2001 | Fujinaga et al. | |
| 2002/0099635 A1 | 7/2002 | Guiragosian | |
| 2002/0107797 A1 | 8/2002 | Combaluzier | |
| 2002/0138417 A1 | 9/2002 | Lawrence | |
| 2002/0194119 A1 | 12/2002 | Wright et al. | |
| 2003/0093366 A1 | 5/2003 | Halper et al. | |
| 2003/0097330 A1 | 5/2003 | Hillmer et al. | |
| 2004/0039688 A1 | 2/2004 | Sulkowski et al. | |
| 2004/0199445 A1* | 10/2004 | Eder | 705/35 |
| 2005/0055373 A1 | 3/2005 | Forman | |
| 2005/0131873 A1 | 6/2005 | Fan et al. | |
| 2005/0222928 A1 | 10/2005 | Steier et al. | |
| 2005/0278192 A1 | 12/2005 | Cantini et al. | |
| 2006/0020814 A1 | 1/2006 | Lieblich et al. | |
| 2006/0181411 A1 | 8/2006 | Fast et al. | |
| 2006/0218169 A1 | 9/2006 | Steinberg et al. | |
| 2007/0192167 A1 | 8/2007 | Lei et al. | |
| 2007/0219817 A1 | 9/2007 | Wu | |
| 2007/0239606 A1 | 10/2007 | Eisen et al. | |
| 2008/0059474 A1 | 3/2008 | Lim | |
| 2008/0126556 A1* | 5/2008 | Perng et al. | 709/231 |
| 2008/0134236 A1 | 6/2008 | Iijima et al. | |
| 2009/0234683 A1* | 9/2009 | Anderson et al. | 705/7 |
| 2011/0173116 A1 | 7/2011 | Yan et al. | |
| 2012/0317008 A1 | 12/2012 | Subramanian | |
| 2012/0317013 A1 | 12/2012 | Luk et al. | |
| 2012/0317027 A1 | 12/2012 | Luk et al. | |
| 2013/0024300 A1 | 1/2013 | Choudhuri et al. | |
| 2014/0089044 A1* | 3/2014 | Nipko et al. | 705/7.31 |
| 2015/0026719 A1* | 1/2015 | Menon | 725/34 |

OTHER PUBLICATIONS

Brause, Rudiger W., "Cascaded Vector Quantization by Non-Linear PCA Network Layers," IEEE, pp. 154-160 (1994).

Chan, Lipehen Alex et al., Automatic target detection dualband infrared imager, Acoustics, Speech, and Signal PICASSP'00 Proceedings, 2000 IEEE International Conference, pp. 2286-2289 (Jun. 9, 2000).

Chatterjee, Chanchal et al., "Self-Organizing Algorithms for Generalized Eigen-Decomposition," IEEE Transactions on Neural Networks, vol. 8, No. 6, pp. 1518-1530 (Nov. 1997).

Chen, Yupeng et al., "High Resolution Adaptive Bearing Estimation Using a Complex-Weighted Neural Network," IEEE, 0/7803-0532-9-92, pp. II 317-II 320 (1992).

Gabrys, Bogdan et al., "Combining labelled and unlabelled data in the design of pattern classification systems," International Journal of Approximate Reasoning 35, pp. 251-273, (2004).

Gunter, Simon, "Multiple Classifier Systems in Offline Cursive Handwriting Recognition," der Universisität Bern, 2 pages (2004).

Hawkins, Simon et al., "Outlier Detection Using Replicator Neural Networks," CSIRO Mathematical and Information Sciences, Canberra ACT 2601, Australia, 10 pages, (2002).

Lazarevic, Aleksandar et al., "Feature Bagging for Outlier Detection," United Technologies Research Center, University of Minnesota, pp. 157-166 (2005).

Mehrotra, Krishan et al., "Elements of Artificial Neutral Networks," MIT Pres, pp. 11, 25, 71, 76, 85-87, 157, 170-171 (1997).

Tsai, Chieh-Yuan, et al., "A Dynamic Web based Data Mining Process System," Proceedings of the 2005 The Fifth International Conference on Computer and Information Technology, pp. 1033-1039 (2005).

West, David et al., "Neural network ensemble strategies for financial decision applications," Computer & Operations Research 32, pp. 2543-2559 (2004).

Wong, A.S.Y. et al., "A Unified Sequential Method for PCA," IEEE, pp. 583-586 (1999).

Zhang, Tiezhu et al., "Study on the Application of Dynamic Balanced Scorecard in the Service Industry," 2008 International Conference on Intelligent Computation Technology and Automation, Digital Object Identifier: 10.1109/ICICTA.2008.359, pp. 1158-1162 (2008).

Hinterseer, K. "The Wolfsberg Anti-money Laundering Principles," Journal of Money Laundering Control vol. 5 (1), pp. 25-41, (Summer 2001).

Miyazaki, A.D., and Fernandez, A. "Internet Privacy and Security: An Examination of Online Retailer Disclosures," Journal of Public Policy & Marketing vol. 19 (1), pp. 54-61 (Spring 2000).

Automated Clearing House, Bank of America Merrill Lynch, downloaded on Mar. 18, 2013 from http://corp.bankofamerica.com/business/ci/landing/ach 3 pages.

Eastern Bank ACH Users Guide downloaded on Mar. 18, 2013 from https://www.easternbank.com/SiteCollectionDocuments/PDFs/tc_ach_guide.pdf (May 2012) 25 pages.

NACHA Layout Spec downloaded on Mar. 18, 2013 from http://www.regaltek.com/docs/NACHA%20Format.pdf 14 pages.

Non Final Office Action of Apr. 30, 2015 for U.S. Appl. No. 14/062,062, 18 pages.

* cited by examiner

|  | $0-10 | $10-20 | $20-40 | $40-80 | $80-160 | $160-320 | $320-640 | $640-1280 | $1280-2560 | $2560-5120 | $5120-10240 | $10240-20480 |  |
|---|---|---|---|---|---|---|---|---|---|---|---|---|---|
| 12AM-2AM | 6<br>194<br>200<br>3 | 15<br>185<br>500<br>3 | 40<br>960<br>1000<br>4 | 20<br>480<br>500<br>4 | 25<br>475<br>500<br>5 | 10<br>190<br>200<br>5 | 12<br>188<br>200<br>6 | 5<br>95<br>100<br>5 | 6<br>94<br>100<br>6 | 10<br>190<br>200<br>5 | 10<br>190<br>200<br>5 | 5<br>95<br>100<br>5 | 164<br>3800 |
| 2AM-4AM | 8<br>192<br>200<br>4 | 8<br>192<br>200<br>4 | 25<br>475<br>500<br>5 | 25<br>475<br>500<br>5 | 12<br>188<br>200<br>6 | 10<br>190<br>200<br>5 | 6<br>94<br>100<br>6 | 10<br>190<br>200<br>5 | 10<br>190<br>200<br>5 | 8<br>192<br>200<br>4 | 5<br>95<br>100<br>5 | 6<br>94<br>100<br>6 | 133<br>2700 |
| 4AM-6AM | 20<br>480<br>500<br>4 | 25<br>475<br>500<br>5 | 10<br>190<br>200<br>5 | 30<br>470<br>500<br>6 | 12<br>188<br>200<br>6 | 6<br>94<br>100<br>6 | 10<br>190<br>200<br>5 | 12<br>188<br>200<br>6 | 25<br>475<br>500<br>5 | 30<br>470<br>500<br>6 | 10<br>190<br>200<br>5 | 12<br>188<br>200<br>6 | 202<br>3800 |
| 6AM-8AM | 50<br>950<br>1000<br>5 | 50<br>950<br>1000<br>5 | 30<br>470<br>500<br>6 | 12<br>188<br>200<br>6 | 35<br>465<br>500<br>7 | 14<br>186<br>200<br>7 | 12<br>188<br>200<br>6 | 35<br>465<br>500<br>7 | 30<br>470<br>500<br>6 | 10<br>190<br>200<br>5 | 12<br>188<br>200<br>6 | 6<br>94<br>100<br>6 | 296<br>5100 |
| 12NOON-2PM | 6<br>194<br>200<br>3 | 20<br>480<br>500<br>4 | 8<br>192<br>200<br>4 | 12<br>188<br>200<br>6 | 14<br>186<br>200<br>7 | 16<br>184<br>200<br>8 | 45<br>455<br>500<br>9 | 16<br>184<br>200<br>8 | 12<br>188<br>200<br>6 | 12<br>188<br>200<br>6 | 8<br>192<br>200<br>4 | 10<br>190<br>200<br>5 | 179<br>3000 |
| 2PM-4PM | 10<br>490<br>500<br>2 | 40<br>960<br>1000<br>4 | 20<br>480<br>500<br>4 | 25<br>475<br>500<br>5 | 12<br>188<br>200<br>6 | 14<br>186<br>200<br>7 | 18<br>182<br>200<br>9 | 8<br>92<br>100<br>8 | 14<br>186<br>200<br>7 | 5<br>95<br>100<br>5 | 10<br>190<br>200<br>5 | 4<br>96<br>100<br>4 | 180<br>3800 |
| 4PM-6PM | 10<br>490<br>500<br>2 | 30<br>970<br>1000<br>3 | 20<br>480<br>500<br>4 | 25<br>475<br>500<br>5 | 14<br>186<br>200<br>7 | 40<br>460<br>500<br>8 | 18<br>182<br>200<br>9 | 14<br>186<br>200<br>7 | 6<br>94<br>100<br>6 | 10<br>190<br>200<br>5 | 5<br>95<br>100<br>5 | 3<br>97<br>100<br>3 | 195<br>4100 |
| 6PM-8PM | 30<br>970<br>1000<br>3 | 25<br>475<br>500<br>5 | 25<br>475<br>500<br>5 | 30<br>470<br>500<br>6 | 10<br>190<br>200<br>5 | 14<br>186<br>200<br>7 | 8<br>92<br>100<br>8 | 8<br>92<br>100<br>8 | 3<br>47<br>50<br>6 | 6<br>94<br>100<br>6 | 2<br>48<br>50<br>4 | 2<br>48<br>50<br>4 | 163<br>3350 |
| 8PM-10PM | 30<br>970<br>1000<br>3 | 40<br>960<br>1000<br>4 | 25<br>475<br>500<br>5 | 10<br>190<br>200<br>5 | 6<br>97<br>100<br>6 | 16<br>184<br>200<br>8 | 7<br>93<br>100<br>7 | 6<br>94<br>100<br>6 | 3<br>47<br>50<br>6 | 7<br>93<br>100<br>7 | 3<br>47<br>50<br>6 | 2<br>48<br>50<br>4 | 155<br>3450 |
| 10PM-MIDNIGHT | 10<br>490<br>500<br>2 | 30<br>970<br>1000<br>3 | 20<br>480<br>500<br>4 | 25<br>475<br>500<br>5 | 14<br>186<br>200<br>7 | 40<br>460<br>500<br>8 | 45<br>455<br>500<br>9 | 16<br>184<br>200<br>8 | 12<br>188<br>200<br>6 | 12<br>188<br>200<br>6 | 8<br>192<br>200<br>4 | 10<br>190<br>200<br>5 | 252<br>4700 |
|  | 240<br>7100 | 333<br>8200 | 263<br>5600 | 240<br>4600 | 210<br>3300 | 241<br>3200 | 237<br>3000 | 158<br>2300 | 163<br>2800 | 132<br>2400 | 82<br>1700 | 76<br>1500 |  |

FIG. 9

RULE OPTIMIZATION FOR CLASSIFICATION AND DETECTION

The present application is a non-provisional of and claims the benefit and priority under 35 U.S.C. 119(e) of U.S. Provisional App. No. 61/782,070, filed on Mar. 14, 2013 and entitled "Rule Optimization and Agent-Based Simulation," and which is incorporated by reference herein for all purposes.

BACKGROUND

Aspects of the disclosure relate to the efficient detection and classification of unauthorized transactional activity through the analysis of transactional data.

Banks, financial institutions, and other entities frequently employ algorithms to detect unauthorized, risky, or suspicious activity affecting client accounts. Sometimes, these algorithms monitor client accounts individually by analyzing data observations that are gathered when activity involving the account occurs. A sample of historical data observations can be referenced to determine typical user behavior, including account usage trends and patterns. Data generated to represent fraudulent transactions or transaction requests can also be gathered and analyzed to determine criminal behaviors, patterns, strategies, targets, or any other past information which may be used to better ascertain fraud likelihoods and risks, and classify newly occurring transactional activity.

When new transactional activity occurs, recent or real-time transactional data can be analyzed in search of information revealing that the activity is similar to other activity known to have been fraudulent or unauthorized. When such information is detected, appropriate security measures may be implemented to protect the account, as dictated by the level of risk ascertained from the information.

BRIEF SUMMARY

This disclosure describes a computer-implemented method, system, or computer-program product for establishing classification rules used within a fraud detection system, and detecting fraud through use of the classification rules. The classification rules are used to evaluate pending transactions, and are established based on the appearance of clustered fraud within a sample of historical transactional events. For example, this disclosure describes a computer-program product tangibly embodied in a non-transitory machine-readable storage medium, the storage medium comprising stored instructions configured to cause a data processing apparatus to perform operations including accessing distributional data representing a distribution of historical transactional events over a multivariate observational sample space defined with respect to multiple transactional variables, wherein each of the transactional events is represented by data with respect to each of the variables, wherein the distributional data is organized with respect to multi-dimensional subspaces of the sample space, wherein each of the transactional events is associated with one of the subspaces based on the respective representative observations, the distributional data specifies a number of the transactional events associated with each of the subspaces, the transactional events include multiple unauthorized transactions and multiple authorized transactions, and the distributional data further specifies, with respect to each of the subspaces, a percentage of the transactional events that are unauthorized transactions, accessing a classification rule that references at least one of the subspaces, modifying the classification rule using local optimization applied using the distributional data, accessing transactional data representing a pending transaction, and classifying the pending transaction based on the modified classification rule and the transactional data.

This disclosure also describes a computer-implemented method, comprising accessing distributional data on a computing device, the distributional data representing a distribution of historical transactional events over a multivariate observational sample space defined with respect to multiple transactional variables, wherein each of the transactional events is represented by data with respect to each of the variables, wherein the distributional data is organized with respect to multi-dimensional subspaces of the sample space, wherein each of the transactional events is associated with one of the subspaces based on the respective representative observations, the distributional data specifies a number of the transactional events associated with each of the subspaces, the transactional events include multiple unauthorized transactions and multiple authorized transactions, and the distributional data further specifies, with respect to each of the subspaces, a percentage of the transactional events that are unauthorized transactions, accessing a classification rule that references at least one of the subspaces, modifying the classification rule using local optimization applied on a computing device, using the distributional data, accessing transactional data representing a pending transaction, and classifying the pending transaction based on the modified classification rule and the transactional data.

Additionally, this disclosure describes a system comprising a processor configured to perform operations including accessing distributional data representing a distribution of historical transactional events over a multivariate observational sample space defined with respect to multiple transactional variables, wherein each of the transactional events is represented by data with respect to each of the variables, wherein the distributional data is organized with respect to multi-dimensional subspaces of the sample space, wherein each of the transactional events is associated with one of the subspaces based on the respective representative observations, the distributional data specifies a number of the transactional events associated with each of the subspaces, the transactional events include multiple unauthorized transactions and multiple authorized transactions, and the distributional data further specifies, with respect to each of the subspaces, a percentage of the transactional events that are unauthorized transactions, accessing a classification rule that references at least one of the subspaces modifying the classification rule using local optimization applied using the distributional data, accessing transactional data representing a pending transaction, and classifying the pending transaction based on the modified classification rule and the transactional data.

BRIEF DESCRIPTION OF THE DRAWINGS

Aspects of the disclosure are illustrated by way of example. In the accompanying figures, like reference numbers indicate similar elements, and:

FIG. 9 depicts an example of historical sample distribution data for an example sample that includes 45,500 transactional events.

DETAILED DESCRIPTION

Figure 1:
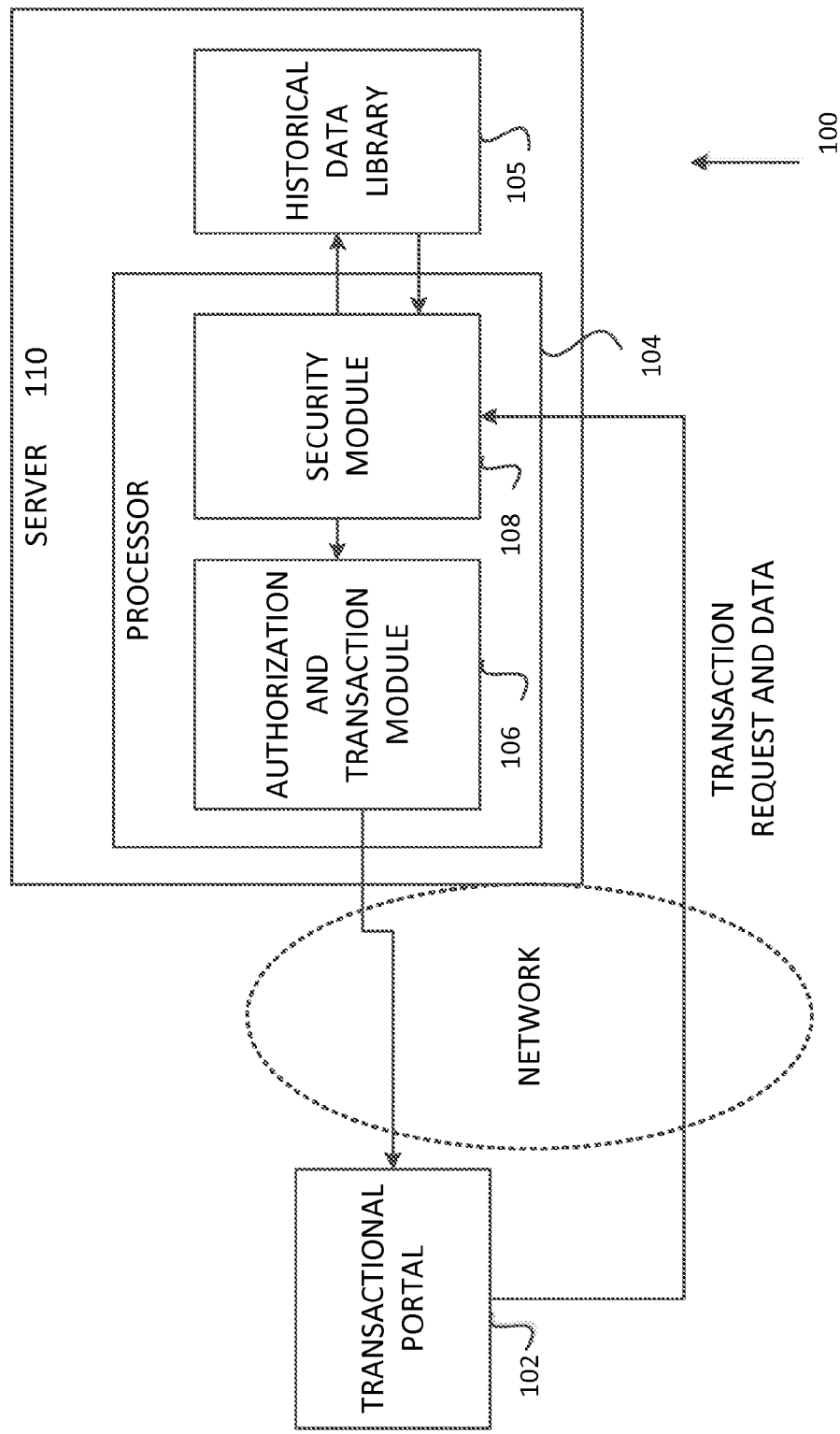
FIG. 1 depicts an example of a fraud detection system that utilizes the techniques, methods and procedures described herein.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims. Where this disclosure provides specific details, examples, implementations, or algorithms related to the subject matter at hand, each such specific description shall be understood as being provided for explanatory purposes only, and as such, indicates only one of the many embodiments which will be readily recognizable to people of ordinary skill in an art to which this disclosure is directed. Thus, no such specific description shall be construed as expressly or impliedly limiting, defining, or delineating the scope of the inventive subject matter presented herein.

Banks, financial institutions, e-commerce businesses, and other entities use analytical algorithms to monitor data generated by client account activity. The data details activity involving the account and is analyzed promptly after being recorded. For example, when a credit card customer swipes a credit card to make a transaction, data observations are recorded. These observations often include an identification of the credit card account being used, the amount of currency involved in the requested (pending) transaction, a location or business identification of the merchant accepting the credit card, and a timestamp.

Processing the pending credit card transaction may involve transmission of the pending transaction data to a remote server, via a secure payment system network connection. At the remote server, the data is analyzed by a processor that executes a classification and scoring algorithm for detecting unauthorized credit card activity. Typically, the algorithm involves processing stored data resulting from the user's previous account activity. The algorithm may also use interpretive parameters, pattern information, guidelines, or formulas previously calculated in response to the user's past account activity or profile information such as the user's age, address, and gender.

The algorithm may also involve using rules or interpretive metrics formulated based on a sample of data representing recent transaction requests. In some cases, the sample may include data representing requests involving many accounts and requests determined to have been made fraudulently or in unauthorized manner. This historical may be analyzed to determine prevalent characteristics of fraudulent behavior, as well as fraudulent behavior trends.

Because the characteristics of fraudulent activity changes over time, the data used by these algorithms may be updated periodically so as to detail the most recent behavior of fraudsters. This disclosure provides several analytical processes and methods which may be used to dynamically update classification rules used by a fraud detection system in executing a transaction classification algorithm. The procedures facilitate modifying the rules so that they will reflect new information provided by the recent historical data.

FIG. 1 is a simplified diagram of a fraud detection system 100 that uses the analytical processes and methods described herein. The fraud detection system 100 may involve a processor 104 that is located at a server 110. The fraud detection system is attached to a network and uses the network to receive transaction requests and transactional data that represents the requests. The transaction requests are entered at transaction portal, one of which is depicted at 102. The network may be used to connect the fraud detection system 100 to any number of transactional portals 102. The fraud detection system 100 may be connected to various types of transactional portals. Common transactional portals to which the fraud detection system 100 may be connected include credit card swipe machines, ATM machines, secure payment system webpages, online banking webpages, and mobile-based payment applications and servers which support or administer these applications and systems.

The processor 104 may execute multiple processor modules. For example, an authorization and transaction processor module 106 may be used to process authorized transactions and provide a transaction completion message to the transactional portal 102 at which the request originated. The security processor module 108 may provide analytical functionality used in the process of detecting fraudulent transaction requests. The security processor module 108 classifies pending transactions as authorized or unauthorized (e.g., "fraudulent") based on the data registered when the pending transactions are requested at transactional portals 102. The security processor 104 also stores all such data and classification labels in the historical data library 105. Data and classification labels are stored in an organized fashion that enables the security module 108 to analyze or summarize various transactional event histories. For example, the storage methodology enables the security module 108 to analyze a history of transactional events involving a single transactional portal 102 or combination of transactional portals, a history of transactional events occurring at similar times, at similar locations, or a history of transactional events satisfying any other such criteria specified with respect to the characteristics of the data stored in the historical data library 105.

The security module 108 may execute software that provides artificial intelligence, neural network, and machine learning capabilities. The software may also provide analytical functionality for pattern recognition, data mining, data prioritization and efficient storage, fraud and loss risk quantification, cluster and abnormality detection and prediction, model building, testing, validation and supervision, statistical and Bayesian inference, fraud detection performance characterization, trend detection and analysis, and data summarization.

The fraud detection system 100, through the operations of the security processor module 108, engages in multiple phases of inference based on the data at its disposal. A first phase may involve analyzing pending transaction data in light of accountholder historical data, and inferring, based on this comparison, a likelihood that the accountholder is involved in the pending transaction.

The rules and rule modification procedures that are disclosed herein may be used in a second phase of inference. In this phase, the pending transaction data is analyzed in light of data representing a large sample of historical transactional events. The authorization status of the transactional events in the historical sample is known. A likelihood that the pending transaction was generated by a fraudster is inferred based on the analysis. The fraud detection system may weigh the two inferences based on additional business factors or concerns, such as the opportunity cost incurred by a false-positive detection or the average amount of damage expected to result from the failure to accurately classify an unauthorized transaction. The inferences may then be compared and the comparison result may be used to estimate the likelihood of the pending transaction having been legitimately requested.

If the fraud detection system 100 determines that the pending transaction is likely to have been requested by the accountholder, the transaction is classified as authorized and further processed to completion. Otherwise, the transaction may be classified as unauthorized and declined. In both cases, the data observations recorded in response to the proposed transaction are stored, and may also be used to update interpretive parameters, guidelines, or formulas for future fraud detection analysis of the user's account activity.

By detecting unauthorized account activity, a financial service provider may be able to avoid costs associated with fraud. However, truly unauthorized transactions are far less frequent than legitimate transactions, and can be very hard to detect. Sophisticated fraudsters frequently moderate, diversify and alter their activity to avoid generating abnormal or outlying transactional data and to hinder detection efforts. Moreover, when detection algorithms fail to detect fraudulent activity and a fraudulent transaction is completed, the transaction may improperly affect the collection of data which the algorithm uses to interpret the customer's normal behavior.

Just as problematically, there can be substantial costs associated with incorrectly classifying legitimate account activity as being unauthorized. For example, by rejecting a legitimately proposed transaction or locking a credit card account in response to an erroneous transaction classification, a credit card company may cause customer dissatisfaction, incur administrative costs, and lose the opportunity to loan money or generate service fees. Moreover, at certain times, companies may be limited in the number of fraudulent transactions that can be investigated and processed in a certain way. This may occur, for example, during a period of time in which consumers are busy, or administrative staff are limited. In light of these concerns, costs, and limitations, the fraud detection techniques disclosed herein have been designed so as to be adjustable over time, based on user-inputted parameters (for example, parameters inputted by an employee or security official representing the financial services provider that operates fraud detection system 100) that can be changed to reflect the specific operating environment in which fraud detection will be performed.

The fraud detection techniques disclosed herein are premised on and informed by the fact that the criminal activity is inherently affected by psychological vulnerability, crowd influence, trends, fads, and patterns. Because criminals collaborate, follow behavioral patterns, follow crowds, and are unable to completely randomize their activities, the criminal environment offers the opportunity for reliable prediction based on past data.

Data related to fraudulent activity reveals that when a vulnerability in security is detected by fraudsters, abnormally high amounts of fraudulent activity will involve attempts to exploit the vulnerability. During a first phase, the amount of fraud associated with the vulnerability may increase exponentially over time as fraudsters become attracted to the vulnerability, better understand how to exploit it, or do not attempt to randomize or disguise their behavior. During a later phase, the abnormal activity associated with the vulnerability may stagnate, decline, or disappear altogether as the vulnerability is repaired, the fraudulent activity is more frequently detected, or more attractive vulnerabilities are discovered.

Commonly, the abnormal incidence will persist until the vulnerability is repaired. A result of this phenomenon is that a certain segment of a transactional activity sample space will be marked by significantly abnormal rates of fraud for a significant time period. The abnormality could manifest itself empirically as an abnormal and statistically significant fraud cluster. Such a cluster may be defined as occurring within certain data intervals (or ranges) with respect to certain variables, or combinations thereof.

Clusters of unauthorized transactions occur when disproportionate numbers of unauthorized transactions are represented by similar data observations with respect to one or more variables. For example, as a hypothetical example scenario, assume that the incidence of unauthorized transactional events (a transaction event is considered an unauthorized transaction event if its representation includes an "unauthorized" fraud label, as determined by human judgment or any fraud detection system) across an entire historical sample is 0.5%. Moreover, assume that several transactional events in the sample are represented by multi-dimensional data falling within a continuous multi-dimension range. For example, there could be a set of sample events which each occurred between 12 PM and 2 AM and involved a request to transact between $200 and $400. If significantly more than 0.5% of these particular events are fraudulent, then the subset of events includes a fraud cluster within it.

Figure 2:
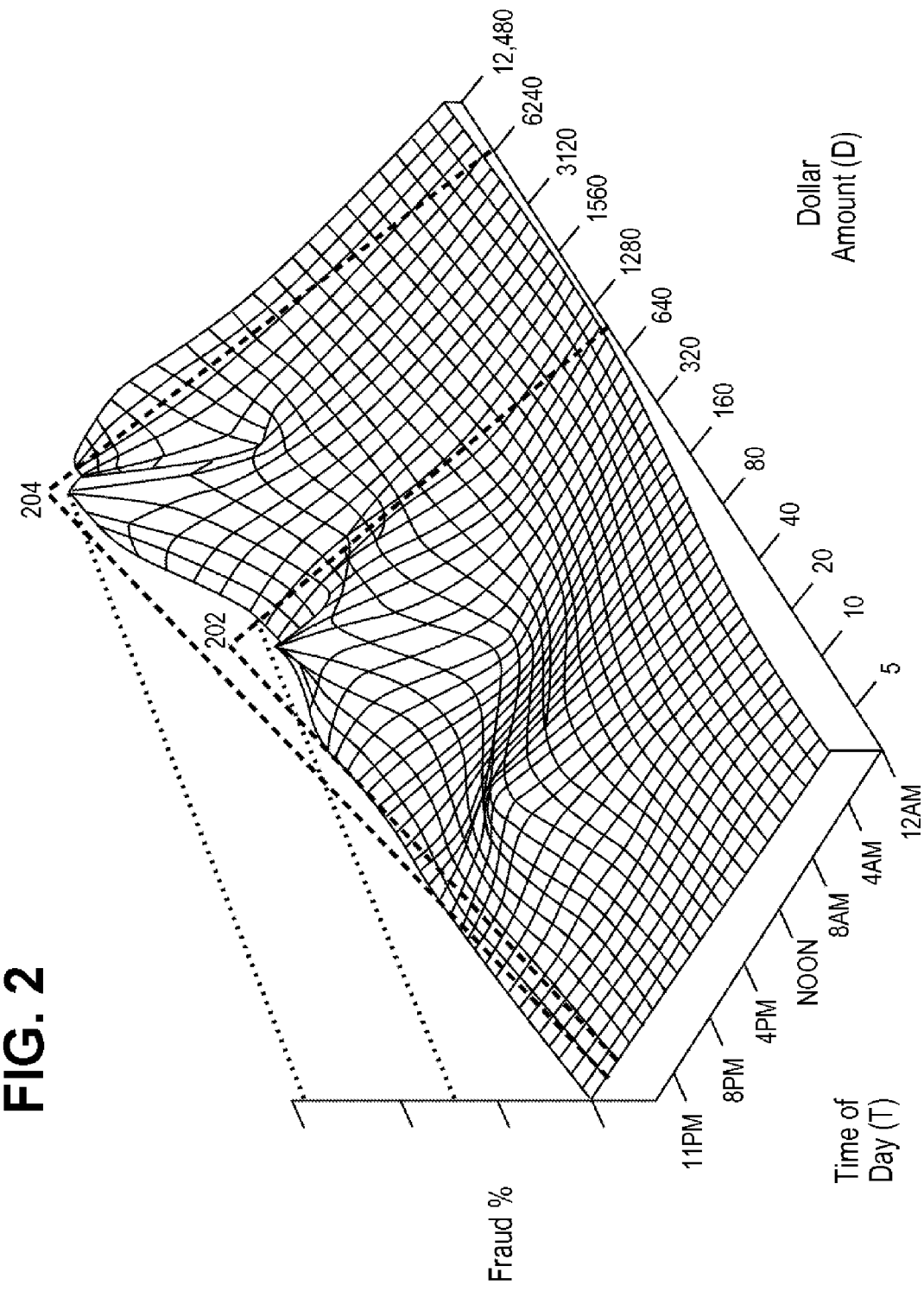
FIG. 2 depicts an example of a fraud cluster as it relates to transactional data used to represent a historical sample of transactional events.

FIG. 2 is a three-dimensional graphical representation that depicts how a cluster may occur within certain data ranges, and how a cluster may be specified by reference to these ranges. The surface shown in FIG. 2 provides percentages of different types of transactional events involved fraud. That is, FIG. 2 is not a probability distribution, but rather displays the contribution of fraudulent transactions within each of various categories of similar transactions. FIG. 2 depicts two significant clusters of fraudulent activity at 202 and 204. The cluster shown at 202 may be described as being found amongst transactional activity occurring between the hours of approximately 8 PM and 11 PM, and involving attempts to transact between $320 and $1280. The cluster shown at 204 may be described as being found amongst transactional activity occurring between the hours of 10 PM and midnight, and involving attempts to transact between approximately $3120 and $9000.

Fraud clusters may be understood by considering a hypothetical situation in which a fraudster is able to hack into a communications network relied on by a network of ATMs. Assume that the fraudster causes the ATMs to accept falsified ATM cards showing an account number within a given range of numbers that correspond to actual accounts. In such a situation, the fraudster might frequently withdraw cash from these ATMs after discovering the vulnerability. In samples of ATM transactions within this fraudster's area of operations, the ATMs targeted by the fraudster might provide data which, in the aggregate, indicates abnormally large numbers of daily, weekly or monthly transactions, as well as abnormally large amounts of money withdrawn during these time periods. The ATMs might further register a high volume of transactions associated with the particular numbers or codes which the fraudster has used to unlock the ATMs.

In fact, a fraudster in such a scenario may be responsible for a significant amount of the activity at one or more of these ATMs, and may access the ATMs following a pattern that is detectable within other ATM data as well. Thus, as one example, a detectably abnormal amount of transaction data associated with the time of day during which the fraudster is active. Similarly, there could be a detectably abnormal amount of transaction data representing an amount of currency which the fraudster favors.

As the scenario above shows, fraudsters' proclivity for exploiting known vulnerabilities and their inability to randomize their behavior means that the process of classifying pending transactions can be informed by the characteristics of a cluster of fraud within a historical sample of transactions. However, individual fraudsters may quickly change their behavior once a targeted vulnerability is repaired, or their activity becomes increasingly detected by algorithms.

Despite the fact that individual fraudsters often quickly change their activities when vulnerabilities are revealed and then subsequently become repaired, aggregated fraudulent activity data does show some level of consistency over time. This fact may occur because those who commit fraud choose similar targets and locations when exploring for vulnerabilities.

As a hypothetical example, if many fraudsters within an area believe that it is most opportune to commit identity theft by misappropriating personal information of wealthy individuals, a disproportionate incidence (cluster) of fraud affecting some segment of premium (high credit limit) accounts might persist throughout a prolonged period of time. In this hypothetical case, the exact nature of the underlying fraud, as well as the specific premium accounts affected by the clustered fraud may change over time.

For example, at any specific time, the efforts of several fraudsters within the area may be focused on certain premium accounts associated with a vulnerability. At a later time, some of these fraudsters might then change their activities to target other premium accounts in the area as their activities are detected or the vulnerability is repaired. In such a case, the incidence of fraud affecting any one premium account or small set of premium accounts might significantly rise and fall quite quickly or unpredictably from day to day. Certain empirical manifestations of the clustered fraud—for example, the times of day over which the fraud is distributed, may morph or evolve as well.

Nonetheless, in the aggregate, the fraudulent behavior may continue to be directed towards premium accounts. Thus, despite these localized changes, an abnormally high incidence of fraud clustered amongst premium accounts in the area may persist for a prolonged period of time simply because fraudsters in the area are attracted to premium accounts when searching for vulnerabilities. In such a case, identifiable changes in the cluster from one period to the next may be used to increase the accuracy of fraud detection measures that are based on cluster recognition. However, in order to identify these changes, new updated analysis must be continually and rapidly performed on most recent available data. It is important that this analysis be both highly accurate in determining how fraud is clustered and efficiently performed so that changes in fraudster behavior can be acted on.

The fraud detection system 100 of the present disclosure uses classification and detection techniques that have been envisioned in response to the previously described patterns and characteristics of fraudulent behavior. In using the techniques explained in this disclosure, the fraud detection system 100 analyzes and classifies pending transactions using any number of classification rules. The classification rules are formulated in view of data representing a historical sample of recent transactional events and the characteristics of a detected cluster of fraudulent activity amongst the events.

The historical sample may include a large number of transactional events registered during a recent sample period. The sample includes both transaction events known to have been unauthorized and transaction events known to have been authorized. Each event may be represented by transactional data that is relevant to the detection of fraud and the characterization of the fraud cluster. Each event is further represented by a fraud label that indicates whether the event was authorized or unauthorized.

The fraud detection system 100 formulates an initial classification rule by accessing an inputted baseline rule involving a condition that is satisfied by a group of similar transactions in the historical sample. The baseline rule may be, for example, a rule that proved effective in the classification of fraud prior to the sample period, or a rule that represents a human expert's intuition regarding the characteristics of a fraud cluster, or a randomly selected condition. The fraud detection system 100 then modifies this initial classification rule by executing an iterative rule modification algorithm that incorporates local optimization based on a greedy heuristic.

In each iteration, the local optimization involves analyzing a limited number of candidate classification rules that are slightly broader in scope than the classification rule being modified. The candidate classification rules are evaluated based on how well they align with a fraud cluster within the sample of historical transactions. The candidate classification rule that best aligns with the cluster is identified, selected, and then, during the next iteration, is again modified in the same way as previously described. The modification process ceases upon the first occurring iteration during which no candidate rule aligns more closely with a fraud cluster then the candidate rule selected during the previous iteration. The last selected candidate rule is then retained as a classification rule available for subsequent use.

After the fraud detection system 100 completes the rule modification, it uses the resulting classification rule to classify pending transactions. While the classification rule is in use, the fraud detection system 100 obtains a new sample of transactional events. This new sample includes the transactional events scored using the rule. If the classification rule becomes stale (e.g. use of the rule is resulting in diminished fraud detection performance) the rule is again modified. Once again, the fraud detection system 100 performs the modification by executing the same local optimization algorithm involving a greedy heuristic. However, in this instance of modification, the fraud detection system 100 performs the local optimization using the most recently obtained sample of transaction events as the source of data for evaluating candidate rules.

Figure 11:
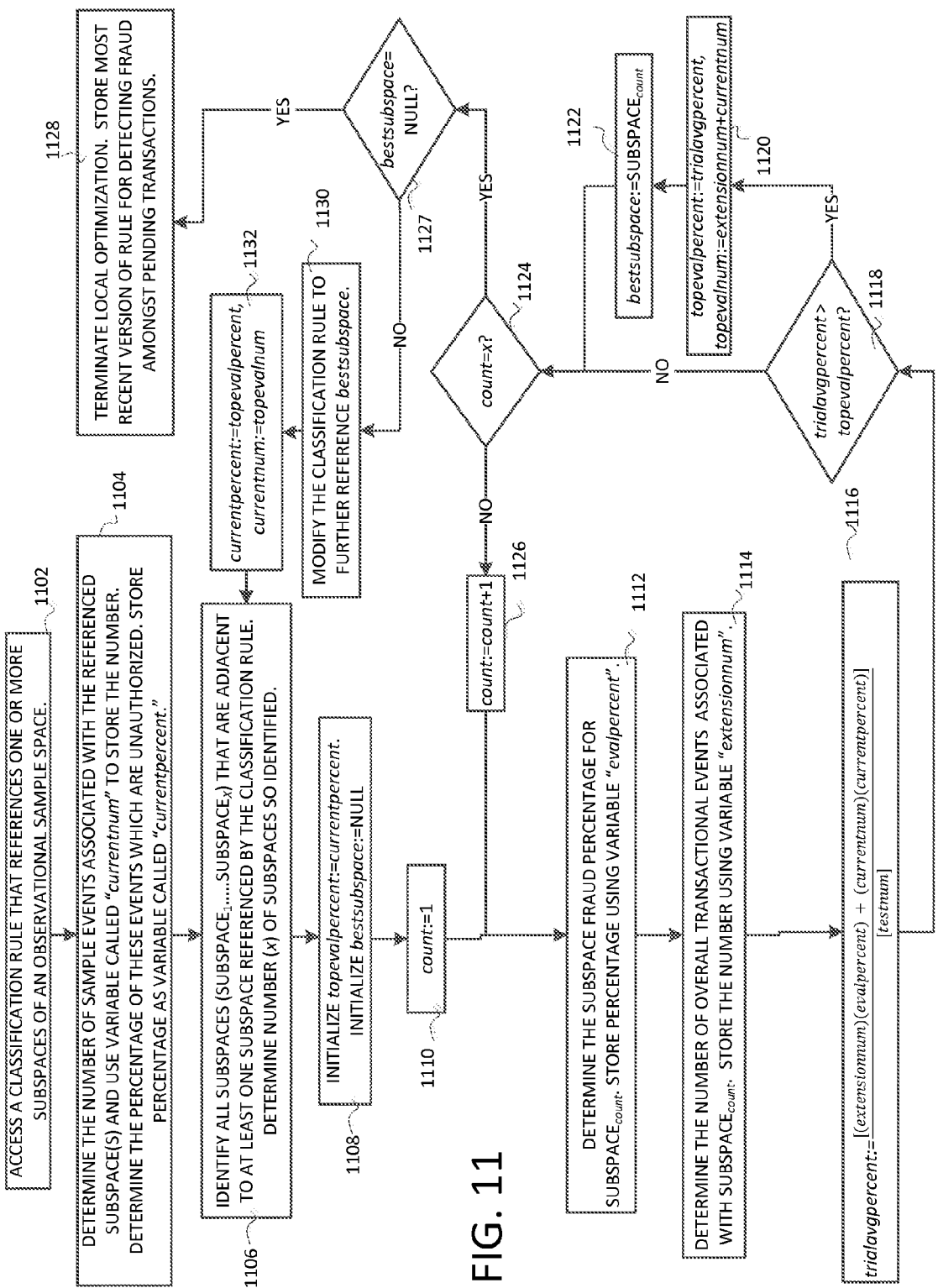
FIG. 11 depicts example operations for modifying a classification rule using local optimization and a greedy heuristic.
Figure 12:
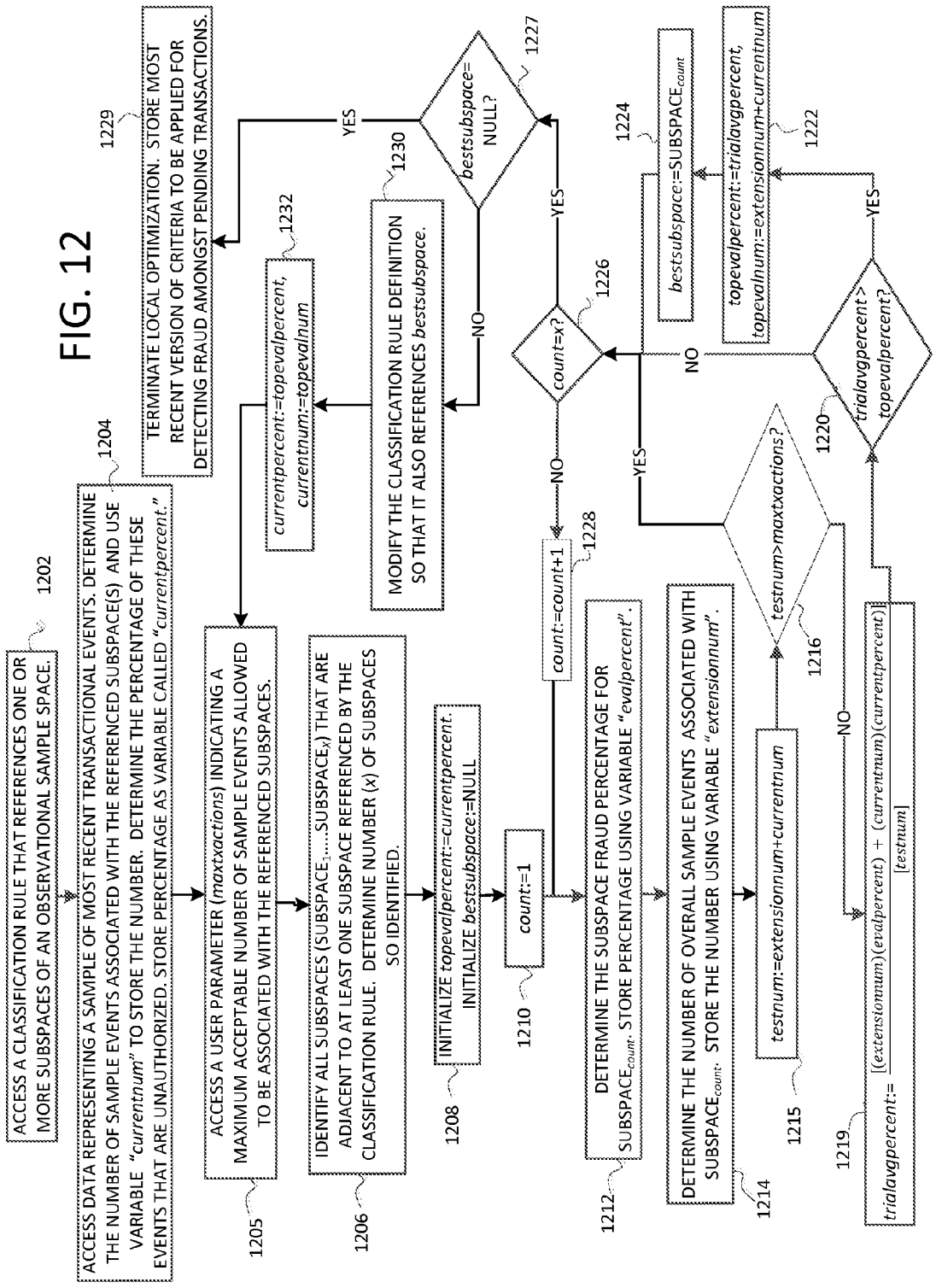
FIG. 12 depicts alternative example operations for modifying a classification rule using local optimization and a greedy heuristic.

FIGS. 11 and 12 provide specific details regarding the modification procedures, including the aspects related to the local optimization, greedy heuristic and measurement of the extent to which candidate rules align with a cluster. The classification rule modification process is explained in these figures and the corresponding text later in this disclosure.

The process of modifying a classification rule, classifying pending transactions using the modified rule while obtaining a new sample, and again modifying the rule using the new sample can be repeated until a fraud cluster has disappeared. When a fraud cluster disappears, a new initial rule may be inputted to the fraud detection system 100 when a human expert believes that another fraud cluster has begun, and the entire process may be performed again.

Alternatively, the fraud detection system 100 may independently search for new clusters by accessing a randomized baseline rule and modifying it based on a new sample of recently classified transactions. The process of classification rule modification, rule application, sample assembly, and subsequent rule modification may be repeated, starting with the randomly generated baseline rule.

Figure 3:
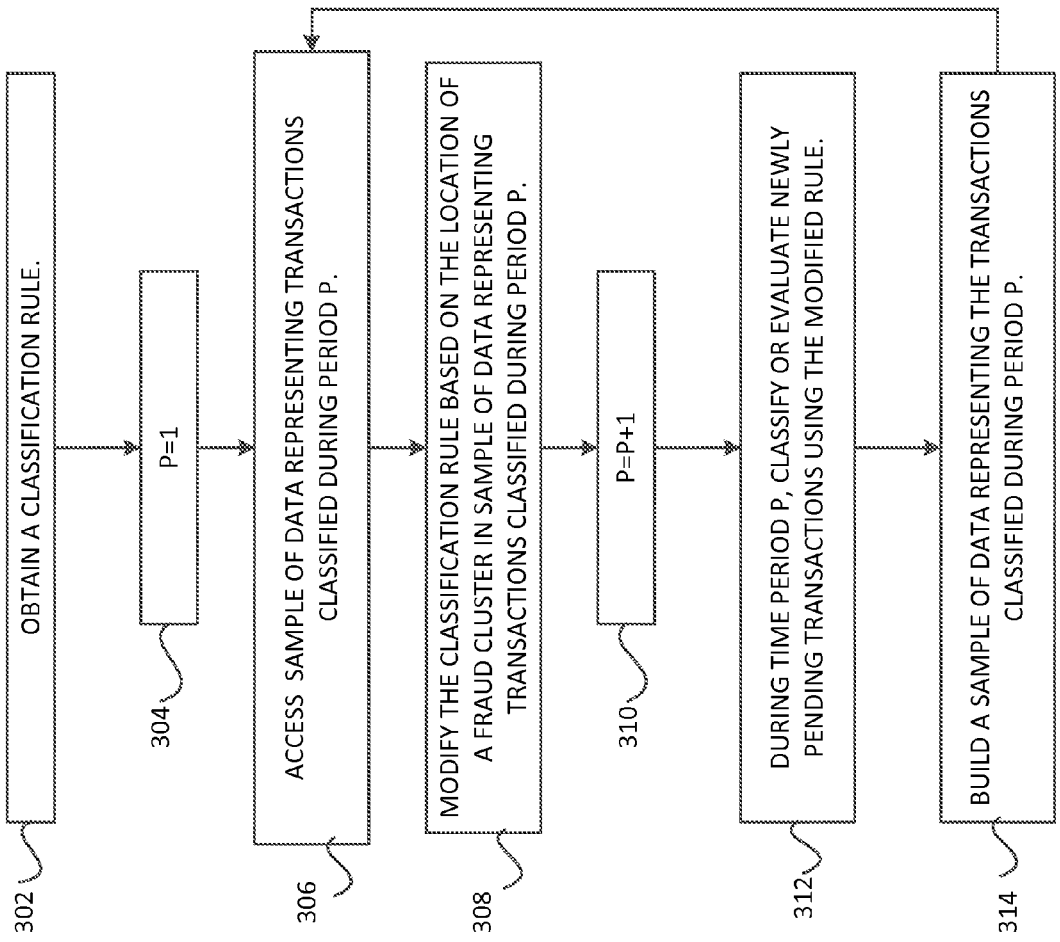
FIG. 3 illustrates generalized example operations of a fraud detection system, as described herein.

FIG. 3 is a flow diagram provided to explain how the fraud detection system 100 may use the process of rule modification, rule application, sample assembly, and subsequent rule modification. At 302, the fraud detection system obtains a classification rule. At 304, a reference variable (p) used for referencing time periods is equal to 1. At 306, the fraud detection system accesses a sample of data representing transactions classified during time period p. At 308, the fraud detection system modifies the classification rule based on the location of a fraud cluster in the sample of data representing transactions classified during period p. At 310, p is incremented.

At 312, the fraud detection system classifies or evaluates newly pending transactions using the rule that results from the modification performed at 308. At 314, the fraud detection system builds a sample of data representing the transactions classified at 312. Subsequently, steps 306-312 may be repeated indefinitely (as portrayed in FIG. 3) or until the targeted fraud cluster disappears.

For the purposes of this disclosure, the scope of the term "transactional event" includes both realized transactions and declined transaction requests. The term "transaction" or "transaction event" will refer, in certain instances, to the transaction or event itself. In other cases, these terms will refer to the data used to represent the transaction or transaction event.

Similarly, the terms "historical sample," "sample," "sample of transactional events," and the like will refer interchangeably to a collection of transaction events and the data that represent these events.

Initially, the fraud detection system uses a historical sample of transactional events that consist of events selected based on some common criteria. The manner in which the criteria is defined shall be understood herein as delineating the sample environment. As an example, the fraud detection system 100 may form a sample of historical transactional events by randomly selecting events involving a specific payment system (e.g. a bank wire system, ACH, debit card, credit card, etc.) within some specified geographic area, and during some specified hour, day, week or other period of time. In such a case, the sample environment would be defined with reference to the operations of the specified payment system within the specified geographic area and during the specified time period.

Choosing the transactional events to include in the historical sample may be done in accordance with any one or more of a variety of methodologies. A first possible methodology may involve aligning the sample environment with the environment in which the classification rule will be used. To clarify this methodology by way of an example, if the classification rule were to be applied exclusively to analyzing pending ATM transactions at casinos in Nevada, the initial historical sample could be defined so as to include only recent transactional events involving ATMs located within Nevada casinos. In this example case, all such recent transactional events could be included in the sample, or the sample could be limited to a randomly chosen subset of such events.

Alternatively, the sample of transactional events may defined to as to include some or all recent events occurring within a larger environment that encompasses the environment in which the fraud detector will operate. Thus, in the same hypothetical situation in which the classification rule will be used to analyze pending ATM transactions at Nevada casinos, the historical sample could include all recent ATM transactional events in Nevada, or could include a randomly chosen subset of such events.

Alternatively, many other methods recognizable to a person of skill in the art may be used to select the events to be included in the historical sample. Any of the aforementioned historical sample selection methods may be more or less appropriate under different combinations of circumstances, and the particular data and detection environment should inform the manner in which the historical sample is defined. Regardless of the method used, however, improved performance may be obtained by ensuring that the sample is chosen so as to not include a disproportionate number of events with either authorized or unauthorized classification labels. That is, if fewer than all available historical events from the sample environment are included in the historical sample, selecting the events to be included in the sample should be done at random.

Data generated with respect to a combination of variables is used to represent each event in the samples used by the fraud detection system 100. Moreover, within a sample, each event is further represented by a classification label indicating a determination as to whether the event was authorized or unauthorized. The event classification labels may reflect previous determinations made using any fraud classification algorithm, analytics, or methodology. Any number of the classifications may also reflect, partially or wholly, any combination of human judgment, inputs, evidence or confirmation. Thus, any number of events in the historical sample may be represented by fraud labels that reflect information provided by an account holder and related to usage of the account.

As an example that will be explained with regards to the previously-mentioned historical sample formed by randomly selecting transactional events involving a specific payment system, the fraud detection system 100 could represent events of this sample using the respective event classification labels, the dollar amounts (D) proposed to be transacted, and the event times (T) registered by the payment system. Thus, the fraud detection system 100 could represent each such transactional event using an ordered triple having as elements the respect event classification label, transaction dollar amount observation, and time of day observation.

For ease of explanation, this disclosure provides several drawings that explain how this particular event representation methodology may be applied within the broader methods and procedures disclosed herein. Thus, in these discussions, the fraud detection system 100 is assumed, for explanatory purposes only, to use a historical sample and represent the sample events based on respective transaction dollar amount observations, transaction time observations, and fraud labels.

However, the techniques disclosed herein may alternatively be applied using a historical sample of transactional events that are each represented by observations with respect to additional or different variables, as well as a classification label. The transaction time and dollar amount variables are only two of the many possible variables which may be used by the fraud detection system 100, and other variables or variable combinations may be used as an alternative to these example variables. Moreover, methodological differences necessitated by representing historical transactional events based on a combination of more than two variables would, in view of this disclosure, be easily recognizable to one of ordinary skill in the art. Thus, this disclosure should not be interpreted in any way that limits the number of variables that are used to represent the historical sample.

Figure 4:
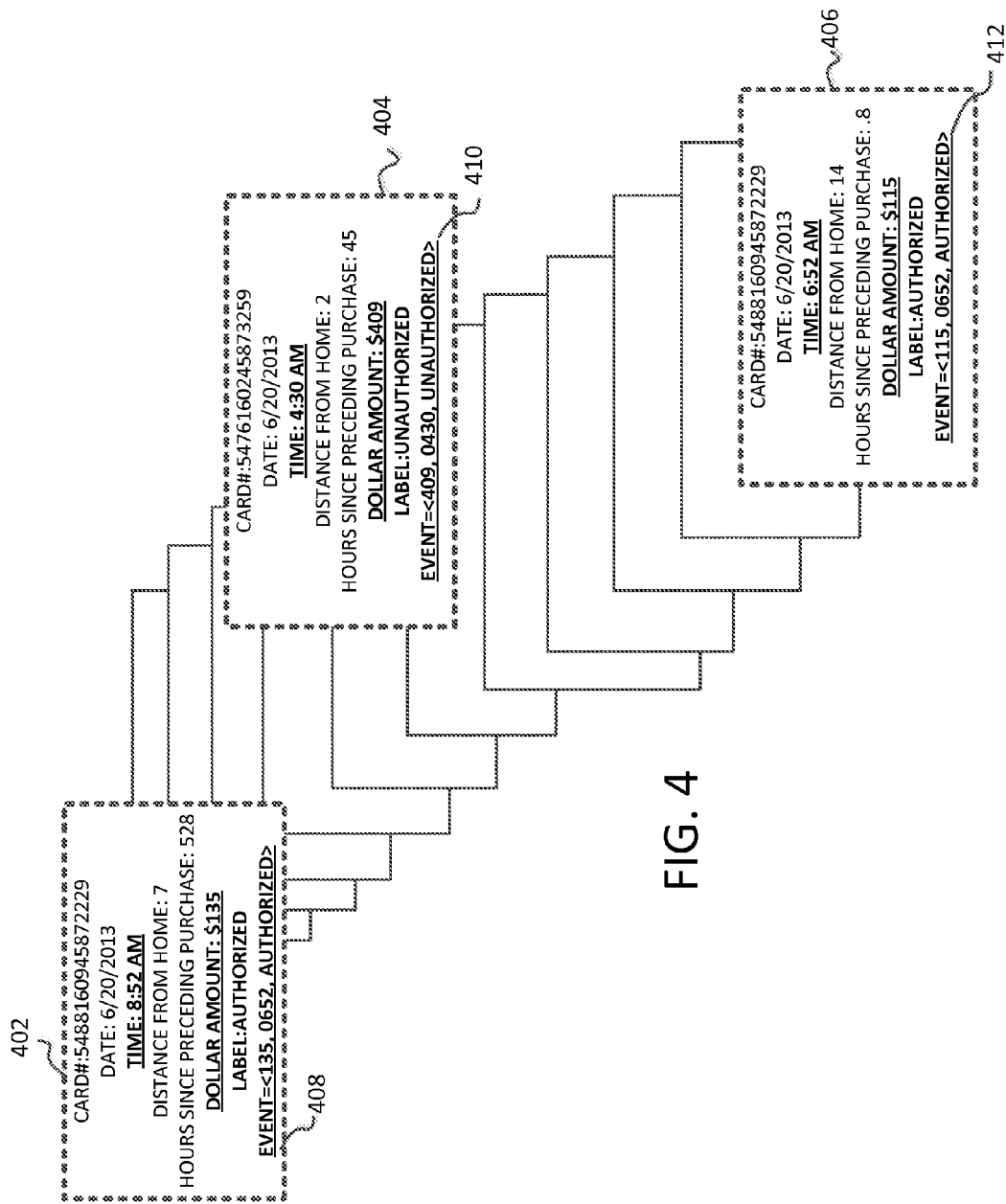
FIG. 4 illustrates example representations of transactional events in a historical sample of transactional events.

FIG. 4 displays three hypothetical events 402, 404, 406 which could be included within a historical sample of credit card transactional events. Moreover, FIG. 4 shows how the fraud detection system 100 may represent events within a historical sample using data observations such as those that are generally recorded automatically at the time of a transaction. For example, each event 402, 404, and 406 is associated with a multi-dimensional listing of data (i.e. card number, date, time, distance from home, hours since preceding purchase, dollar amount) generated by the credit card payment system associated with the sample.

FIG. 4 further depicts how the fraud detection system 100 may represent events of a sample based on a limited combination of variables. For example, in FIG. 4, events 402, 404, and 406 are represented by ordered triples 408, 410, and 412 respectively. Each ordered triple 408, 410, and 412 provides the respective time and transaction dollar amount data as well as the event classification label. As will be better understood with reference to FIGS. 5 and 8, when the fraud detection system 100 analyzes a sample for purposes of modifying a fraud classification rule, use of ordered tuples such as 408, 410, and 412 provides a convenient way of processing the sample data.

In subsequent paragraphs, this disclosure will use the term "observational sample space" to refer to a data processing concept that will now be explained. This fraud detection system 100 uses observational sample spaces to represent and analyze historical samples of transactional events, characterize fraud clusters within the sample, and define the classification rules and candidate classification rules based on the fraud cluster. Insofar as the inventors are aware, the term observational sample space carries no widely understood meaning or connotation recognizable in the art. Therefore, the term observational sample space shall be understood in the manner that will now be defined, explained, and suggested.

For the purposes of this disclosure, an observational sample space is the multidimensional parameterized universe of possible combinations of data available for representing transactional events of a historical sample. The observational sample space depends on the event representation methodology used by the fraud detection system 100, and includes all such combinations of data available for representing events in accordance with the methodology. However, with respect to the definition of an observational sample space, the fraud label components of event representations are not considered to be data.

The dimension and parameters of any observational sample space are based on the particular event representation methodology used by the fraud detection system 100. For example, when an event representation methodology involves four transactional variables in conjunction with an event classification label (for example, using a 5-tuple representation), the observational sample space may be one, two, three or four-dimensional, and each dimension may be associated with a different one of the variables involved in representing the events.

As described above, the fraud detection system 100 of FIG. 4 may represent sample events using ordered triples such as 408, 410, and 412. In accordance with this representation methodology, each event in a historical sample is represented by transaction time data, transaction dollar amount data, and a fraud label. Thus, the fraud detection system 100 may employ a two-dimensional observational sample space used in conjunction with this particular event representation methodology. The two-dimensional observational sample space would consist of all ordered pairs in which the first element is a time of day, and the second element is a dollar amount (decimalized observations with respect to a transaction dollar amount may be rounded to whole numbers of dollars). Such a universe may be conceptualized as a set of ordered pairs.

Alternatively, this example observational sample space may be conceptualized as a collection of points in a two-dimensional Cartesian plane defined with respect to the transaction dollar amount variable and the time of day variable. If a two-dimensional observational sample space is conceptualized as a plane parameterized using Cartesian points, each point may be understood as representing an element of the observational sample space. The limits, dimensions, and parameterization of the observational sample space may be represented visually in two dimensions. When the fraud detection system 100 uses a two-dimensional observational sample space to analyze a historical sample of transactions, each sample event may be understood as being associated with a specific point in the observational space, as determined by the two variable observations that represent the event.

Figure 5:
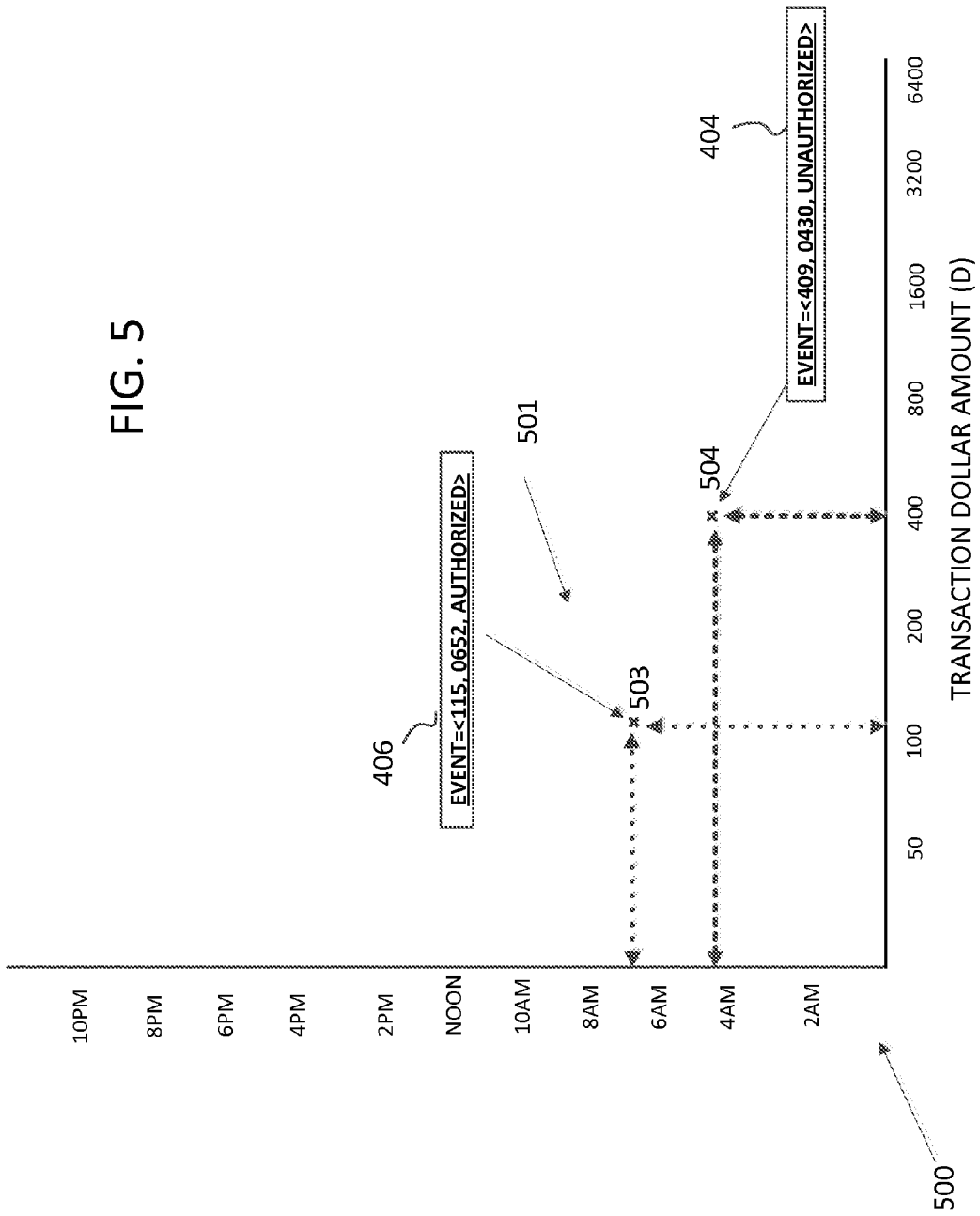
FIG. 5 is a visual representation of one example of an observational sample space.

FIG. 5 depicts a two-dimensional observational sample space 500 conceptualized as a plane. FIG. 5 further depicts the association of individual sample events 404, 406 with a specific point in the observational sample space 500.

Within the observational sample space 500, each two-dimensional combination of data available for representing sample events is represented by a point in the plane. The transactional dollar amount associated with each point is represented by the displacement of the point in the horizontal (x) dimension, and the transaction time of day is represented by the displacement of the point in the vertical (y) dimension.

For example, the observational sample space includes the ordered pair at (200, 0830). Specifically, in the observational space 500, the point representing this specific combination is depicted at 501. If the fraud detection system 100 were to analyze a historical sample and determined that it includes a $200 transaction that occurred at 8:30 AM, the system 100 would associate this particular event with point 501 (200, 0830) in the observational sample space 500.

FIG. 5 shows representations of two events 404 and 406 from the hypothetical historical sample discussed in the description of FIG. 4. These two event representations involve the ordered triple methodology discussed previously with regards to FIG. 1. Moreover, the events 404 and 406 are further explained by reference to points 503 and 504 on the observation sample space. Here, points 503 and 504 are specifically referenced so as to show how an event and its representation can be intuitively associated with a point in the observation sample space. As shown by dashed arrows referencing the horizontal and vertical positions of points 503 and 504 in the observational sample space, points 503 and 504 are representations of ordered pairs (115, 0652) and (409, 0430) respectively. Accordingly, as suggested by the drawing, if the fraud detection system 100 were to apply observational sample space 500 to the analysis of a historical sample that included events 404 and 406, event 406 would be associated with point 503 and event 404 would be associated with point 504.

Regardless of the type of abstraction (Cartesian, sets, etc.) used to represent an observational sample space, an observational sample space 500 may be segmented into component subspaces. Each subspace may be conceptualized as a bin or continuous multi-dimensional range that represents a portion of the observational sample space and is uniquely defined by a range of values with respect to each observational sample space dimension. Accordingly, where the observational sample space is n-dimensional, each subspace may also be defined by a range specified with respect to each of the n dimensions.

Figure 6:
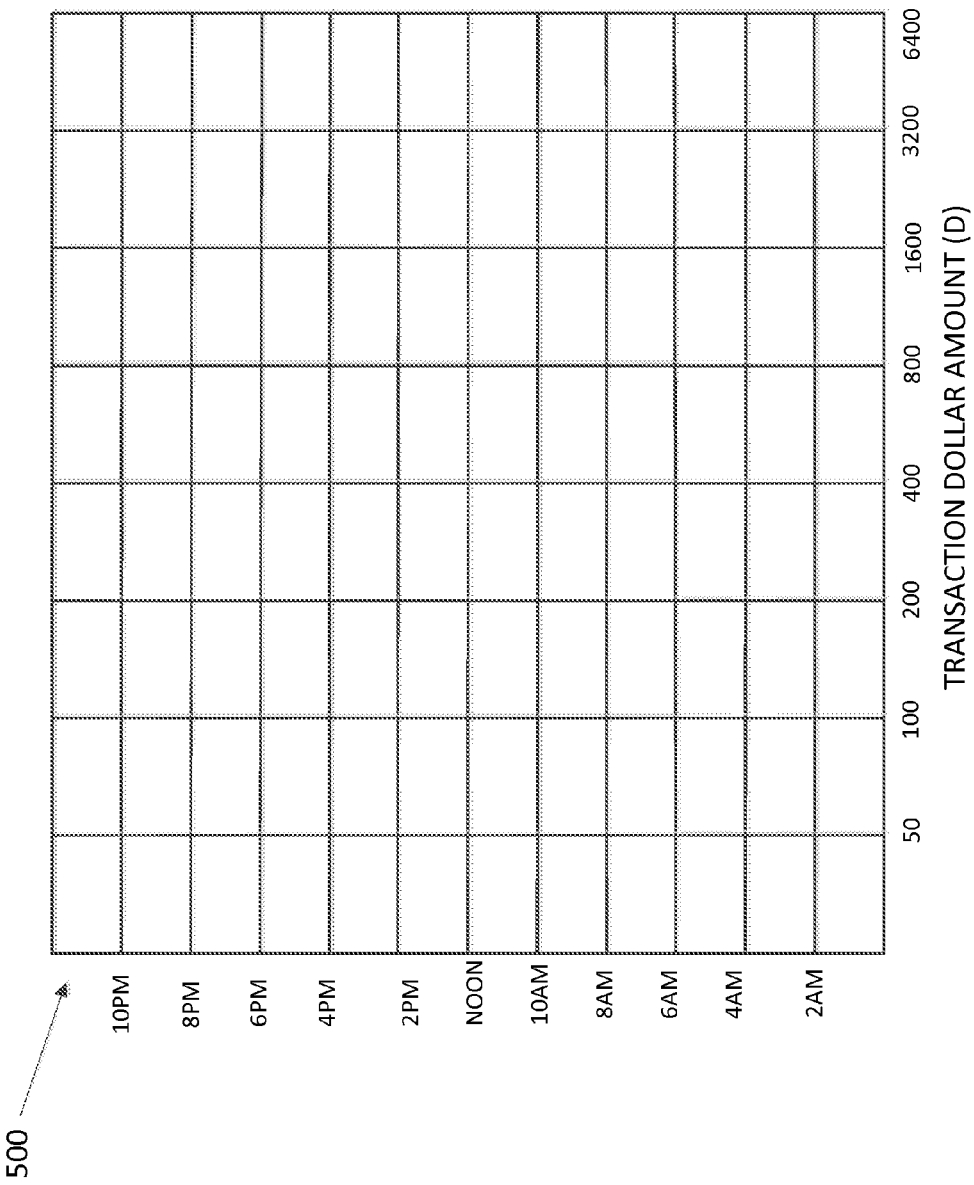
FIG. 6 is an example of a visual representation of the segmentation of an observational sample space into subspaces.

For the purpose of this disclosure, intersecting subspaces may be defined so such that multiple subspaces include certain points that are also included in other subspaces. Alternatively, subspaces may be exclusive, so that no point from the observation sample space is included in more than one subspace. FIG. 6 is a visual representation of one way in which the observational sample space 500 may be segmented into exclusive subspaces. This visual representation uses a portion of a Cartesian plane to show the observational sample space, and vertical and horizontal lines to indicate the variable ranges used to define the various subspaces.

As may be understood with reference to FIG. 6, the example observational sample space 500 is segmented into 96 different subspaces. The segmenting shown in FIG. 6 is exemplary only and shall not be interpreted as requiring any specific parameters or variable ranges for use in defining subspaces. In actual implementation of the techniques described herein, it may be preferable to use many more than 96 subspaces, and the precise manner of segmenting an observational sample space 500 may be dependent on the statistical nature of the historical sample being used, processing constraints, and any number of other situationally-dependent considerations. For example, with regards to any variable, the variable ranges used to define a subspace need not be equivalent from any one subspace to the next.

Figure 7:
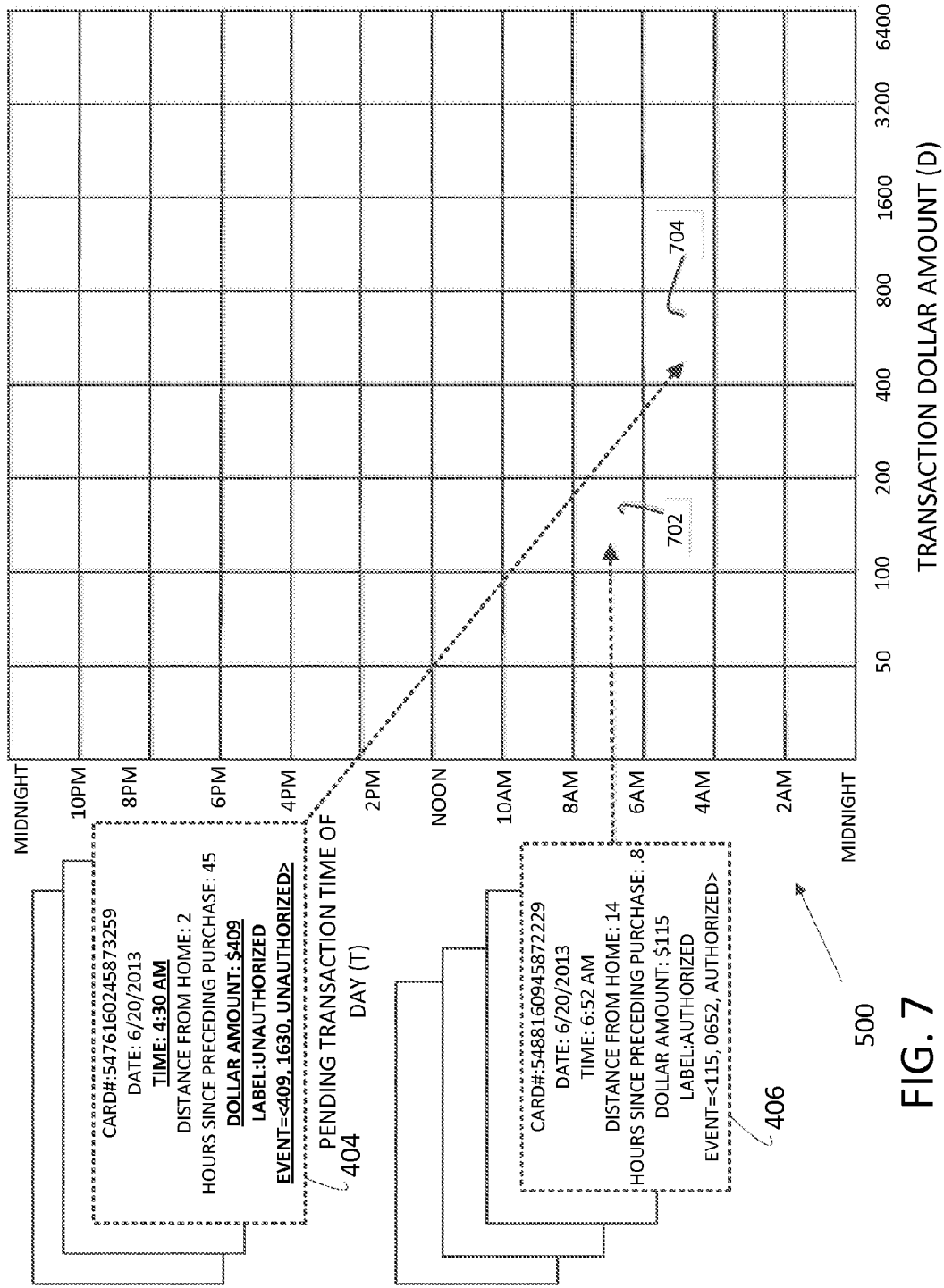
FIG. 7 is an example of a visual representation of the association of transactional events with subspaces of an observational sample space.

FIG. 7 is provided to show how sample events may be associated with subspaces in addition to points in the observational sample space 500. For example, events 404 and 406 were discussed earlier with regards to FIG. 4. As shown in FIG. 7, the data that represents events 404 and 406 fit within the multi-dimensional ranges which define subspaces 704 and 702, respectively. Accordingly, these events 404 and 406 may be conceptualized as being associated with subspaces 704 and 702, respectively.

Figure 8:
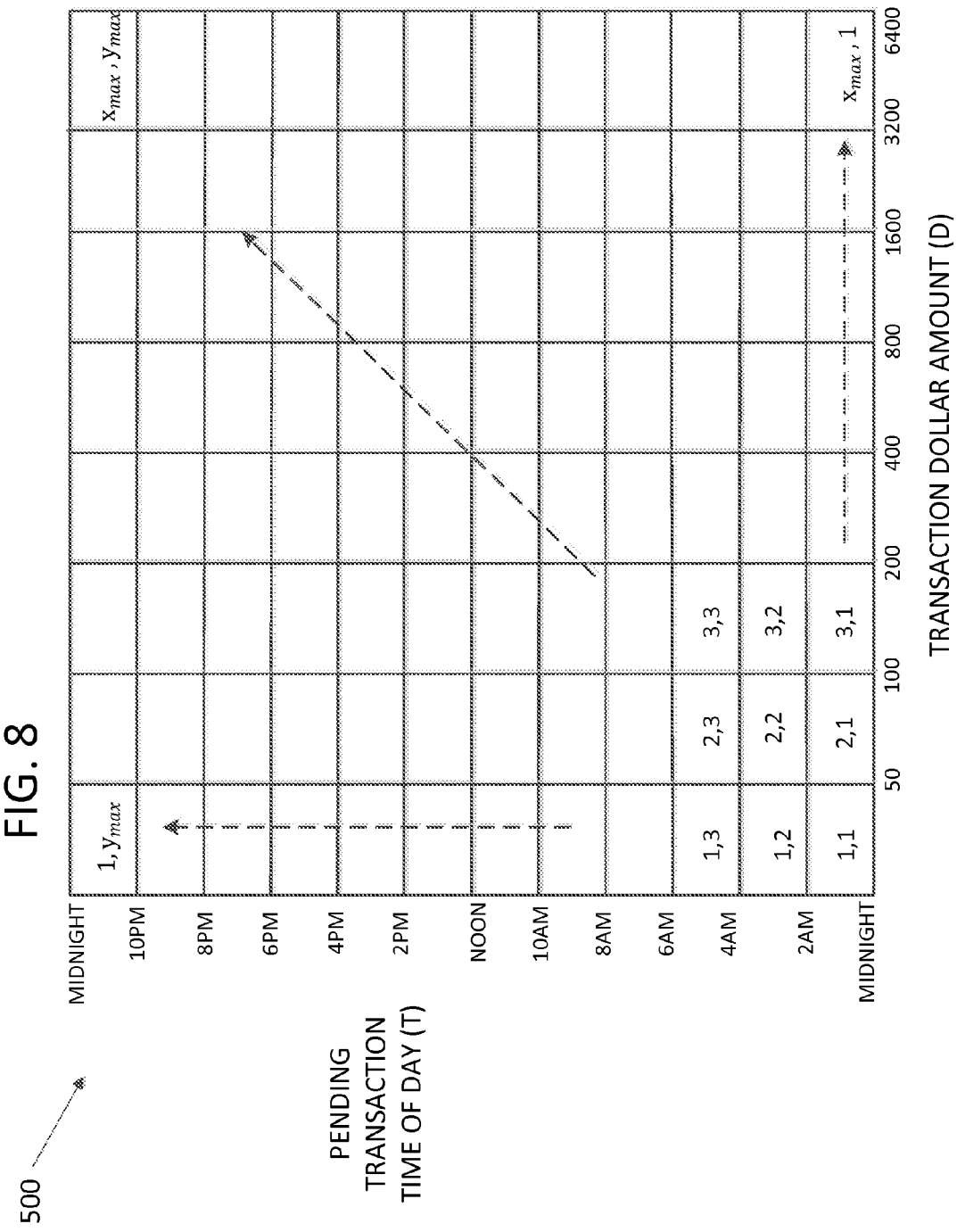
FIG. 8 depicts an example of a methodology for referencing subspaces of an observational sample space.

FIG. 8 depicts the same observational sample space 500 and subspaces shown in FIG. 7. However, in FIG. 8, the sample spaces are referenced by an indexing system for referencing subspaces that may be used by the fraud detection system 100 disclosed herein. The reference methodology depicted in FIG. 8 involves assigning a unique ordered pair or vector to each subspace. Each ordered pair represents the row and column orientation of its respective subspace relative to other subspaces in the observational sample space. In this way, the fraud detection system 100 may identify each subspace using a specific ordered pair. Moreover, the fraud detection system 100 may use the subspace ordered pairs to index the variable ranges that define the subspaces used within the system 100.

In accordance with this disclosure, the fraud detection system 100 may segment an observational sample space 500 into subspaces and use the subspaces to represent a distribution of events in a historical sample. The distribution of events may be specified with respect to subspaces and may be evaluated to determine clustering phenomenon within the sample. Specifically, this evaluation includes assigning each event to a subspace based on the event representation. As events are assigned to subspaces, the fraud detection system 100 performs an inventory process with respect to each subspace. An inventory process with respect to a subspace includes counting the authorized events assigned to the subspace, and the unauthorized events assigned to the subspace. Also, a total number of assigned events is calculated. Also, the fraud detection system calculates a subspace fraud percentage. A subspace fraud percentage is the percentage of events assigned to the subspace which were unauthorized transactional events.

The various subspace fraud percentages and the inventory counts of unauthorized and authorized transactions assigned to the various subspaces will be referred to hereinafter as "historical sample distributional data". The fraud detection system 100 stores the historical sample distributional data in a multi-dimensional data structure within historical data library 105. The data is stored using indexing, such that each unauthorized event count, authorized event count, and subspace fraud percentage is indexed to the subspace for which it was computed.

FIG. 9 depicts a hypothetical assignment of 45,500 historical sample events to subspaces of two-dimensional observational sample space 500. FIG. 9 also depicts historical sample distributional data representing this particular hypothetical sample of events. As depicted, the observational sample space 500 is segmented into 144 exclusive subspaces. The 144 subspaces are represented as rectangles, and each such rectangle further contains example historical sample distribution data calculated with respect to the subspace thereby represented. For each subspace, the topmost number represents the respective count of fraudulent transactional events. The second-topmost number represents the respective count of authorized transactional events, and the second lowermost number represents the respective quantity of events overall. The lowermost number represents the subspace fraud percentage.

As described previously, the subspace addresses (ordered pairs, vectors, or the like) of an observational sample space 500 provide an indexing method for referring to distributional data computed with respect to the subspaces. By referencing a single subspace address, the fraud detection system 100 is able to retrieve the fraud distribution data indexed thereto, and can process the data for the purpose of identifying clusters. Also, the fraud detection system 100 can evaluate contiguous combinations of subspaces in an attempt to find a subspace combination that corresponds to a fraud cluster.

Hereinafter, a continuous combination of subspaces will be referred to as a composite subspace. In evaluating a composite subspace, the fraud detection system 100 aggregates historical sample distributional data from each individual component subspace of the composite subspace to determine a composite subspace fraud percentage. This computation may be performed by calculating a weighted average of the fraud percentages of the component subspaces. In such a case, the weightings may be in proportion to the overall number of transactions assigned to the individual subspaces.

Figure 10A:
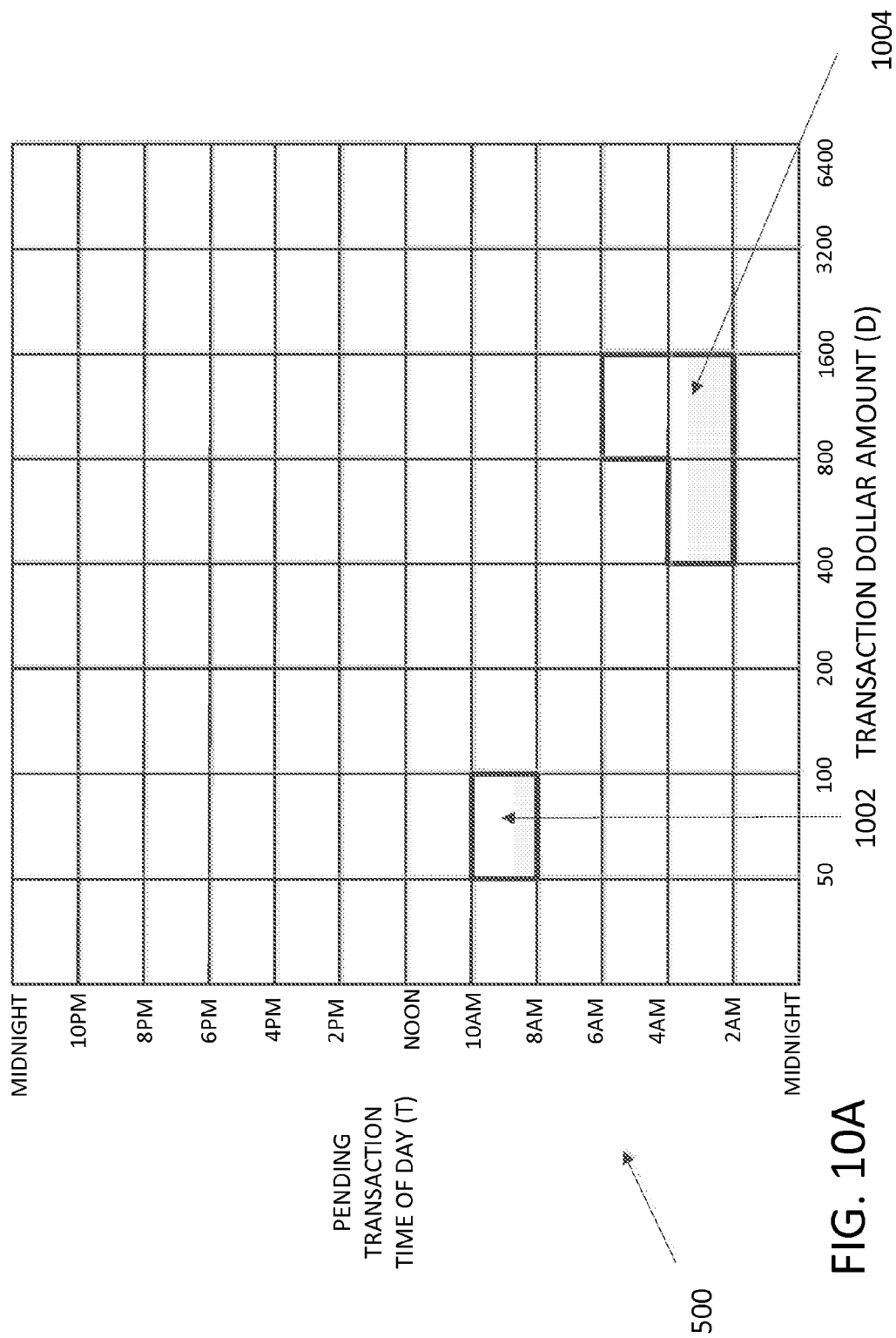
FIG. 10A depicts an example for how a fraud detection system may use classification rules defined by reference to subspaces of an observational sample space.

FIG. 10A indicates two different references to subspaces within a segmented observational sample space 500. At 1002, a reference is made to subspace (2,5). Additionally, a reference to a composite subspace is depicted at 1004. Within the fraud detection system, a reference to the composite subspace could be made by making a combined reference to its component subspaces (5,2), (6,2) and (6,3).

In analyzing a historical sample of transaction events using a segmented observational sample space 500, the fraud detection system 100 uses subspaces as a means of forming a classification rule for analyzing future pending transactions. Thus, when the fraud detection system 100 finds that a subspace or a composite subspace has an abnormally high fraud percentage (e.g., can be used to refer to a fraud cluster) within a historical sample, that subspace or composite subspace may be referenced as part of a classification rule applied in analyzing pending transactions. For example, the fraud detection system 100 may classify a pending transaction as fraudulent based on the transaction data falling within the variable ranges which define such a subspace.

Figure 10B:
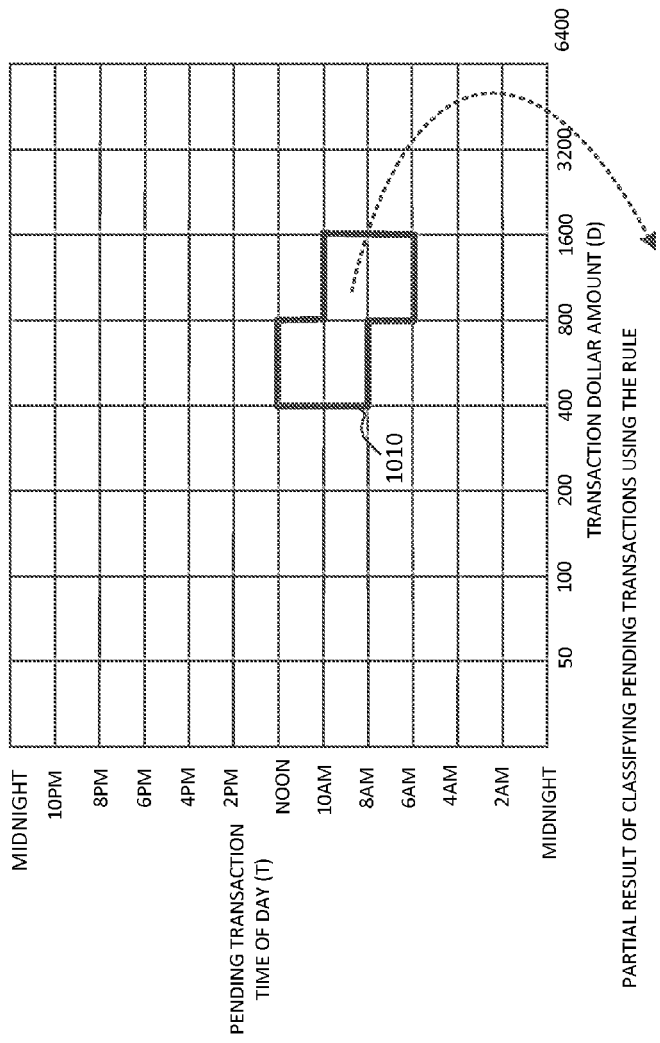
FIG. 10B depicts example results of applying a classification rule to the evaluation of pending transactions.

FIG. 10B provides a representation of how the fraud detection system 100 may define a classification rule to reference subspaces and apply the rule to the process of classifying pending transactions. In FIG. 10B, a classification rule 1010 is depicted with respect to an observational sample space 500. The classification rule is defined by reference to a composite subspace. At 1020, FIG. 10B displays a partial summary of classification results that could be generated by fraud detection system 100 in applying fraud classification rule 1010 to evaluate pending transactions.

Applying a subspace or composite subspace as a classification rule (or as part of a more complex classification formula or decision metric) in this way may be premised on the assumption that, subsequent to the sample period, similar clustering of unauthorized activity (which may be thought of as a later version of the same cluster) will continue in much the same manner as the clustering found within the historical sample. As described earlier, even though clusters may be detectable from one analyzable period to the next, or even over the course of several such periods, stationarity will rarely be observed in the data associated with the clustered fraudulent transactions. Thus, if a sample period fraud cluster is found within a subspace, then the same subspace should be expected to be less precise in identifying a later version of the cluster shortly after the sample period, even though the clustering may be quite similar from the earlier period to the later time.

From one time period to the next, the clustering could become more focused (i.e., narrower standard deviation), for example, when fraudsters hone in or more precisely identify a vulnerability. In this case, the classification rule, although precise as to the earlier version of the cluster, would be overly broad as to the later version. That is, improving the criteria would necessitate eliminating one or more subspaces from the criteria definition.

Alternatively, the clustering could drift (i.e., the average shifts) as some fraudsters continue their pattern of behavior, but modify it to a small degree. In this case, the criteria might be defined using an appropriate number of subspaces but a suboptimal combination of subspaces. As a general rule, when clustered fraudulent behavior persists for a period of time, the lack of stationarity means that any subspace or composite subspace that precisely corresponds to one version of the cluster will become increasingly imprecise as a decision tool for identifying later versions of the cluster, and the imprecision will grow exponentially over time. To deal with this phenomenon, the fraud detection system 100 performs modification of classification rules using current historical samples of transactional events.

FIG. 11 provides an algorithm that may be used by the fraud detection system for modifying a classification rule. The algorithm of FIG. 11 involves local optimization and a greedy heuristic. The greedy heuristic is the basis for determining the modifications made to the classification rule.

At 1102, the fraud detection system accesses a classification rule that references one or more subspaces of an observational sample space. At 1104, the fraud detection system determines the number of sample events associated with the referenced subspace(s) and uses a variable called "currentnum" to store the number. The fraud detection system also determines the percentage of these events that are unauthorized. The percentage is stored as a variable "currentpercent."

At 1106, the fraud detection system identifies all subspaces that are adjacent to at least one subspace referenced by the classification rule. The system further determines the number of subspaces ("x") so identified.

At 1108, the fraud detection system performs a series of variable initializations. At 1110, the system initializes a count variable. At 1112, the fraud detection system determines the subspace fraud percentage for $SUBSPACE_{count}$ and stores it using a variable called "evalpercent." At 1114, the fraud detection system determines the number of sample events associated with the indicated subspace. This number is stored using a variable called "extensionnum." At 1116, the fraud detection assigns a value to variable "trialavgpercent" as indicated in the drawing.

At 1118, the fraud detection system determines if trialavgpercent is greater than topevalpercent. If an affirmative determination is reached, the fraud detection system updates variables "topevalpercent" and "topevalnum" as indicated at 1120. Next, at 1122, the fraud detection system updates variable "bestsubspace" as indicated.

Conversely, if an affirmative determination is not reached at 1118, the fraud detection system performs the determination indicated at 1124. If the fraud detection system fails to make an affirmative determination at 1124, it increments variable count at 1126 and then continues the optimization at 1112.

If the fraud detection system makes an affirmative determination at 1124, it determines whether variable bestsubspace is NULL, as indicated at 1127. If an affirmative determination is made at 1127, the optimization is terminated at 1128.

If an affirmative determination is not made at 1127, the classification rule is modified, as indicated at 1130. Subsequently, the fraud detection system updates variables as shown at 1132. The process then continues at 1106, and subsequent process iterations occur until the exit condition at 1126 is satisfied.

As described above, the steps of FIG. 11 involve the modification of a classification rule by iteratively expanding the scope of a rule that is defined using a composite subspace. In each iteration of this process, the composite subspace is redefined so that it will include one additional subspace. This local search operation may be easily modified in many ways which are intended to be covered by this disclosure.

For example, the algorithm of FIG. 11 may be expanded so as to incorporate evaluation of candidate rules which are narrower in scope than a classification rule being modified. Additionally or alternatively, candidate rules may be defined using a variety of other criteria different than the criteria explained in FIG. 11.

FIG. 12 depicts an alternative local optimization algorithm that the fraud detection system may use to perform modification of a classification rule. With the exception of three additional steps depicted at 1205, 1215, and 1216, the algorithm of FIG. 12 substantially similar to the algorithm of FIG. 11. For example, steps 1202, 1204, 1206-1214, and 1220-1232 are substantially similar to steps 1102, 1104, 1106-1114, and 1120-1132. Also, step 1219 is substantially similar to step 1118. For this reason, only steps 1205, 1215, and 1216 will be discussed in detail herein.

Steps 1205, 1215, and 1216 involve accessing a user-specified parameter (maxtxactions). The parameter may be used and altered to impose a maximum classification rule scope. In other words, a fraud detection system 100 user may wish to avoid using a classification rule that may result in an excessive number of unauthorized classifications. The maxtxactions parameter, as used in the local optimization algorithm of FIG. 12, imposes a condition upon which the local optimization ceases to further enlarge the scope of a classification rule.

The algorithms of FIG. 11 and FIG. 12 enable the fraud detection system 100 to modify classification rules by causing the classification rules to refer to additional subspaces. However, in light of this disclosure, these local optimization procedures may be very easily altered so that more complex candidate classification rules are evaluated in each procedural iteration. For example, in modifying classification rules, fraud detection system 100 may use candidate classification rules that are narrower in scope than the classification rule being modified. Additionally or alternatively, fraud detection system 100 may evaluate candidate classification rules that both:

a) reference at least one subspace not referenced by the rule being modified; and
b) do not reference at least one subspace that is referenced by the rule being modified.

Figure 13:
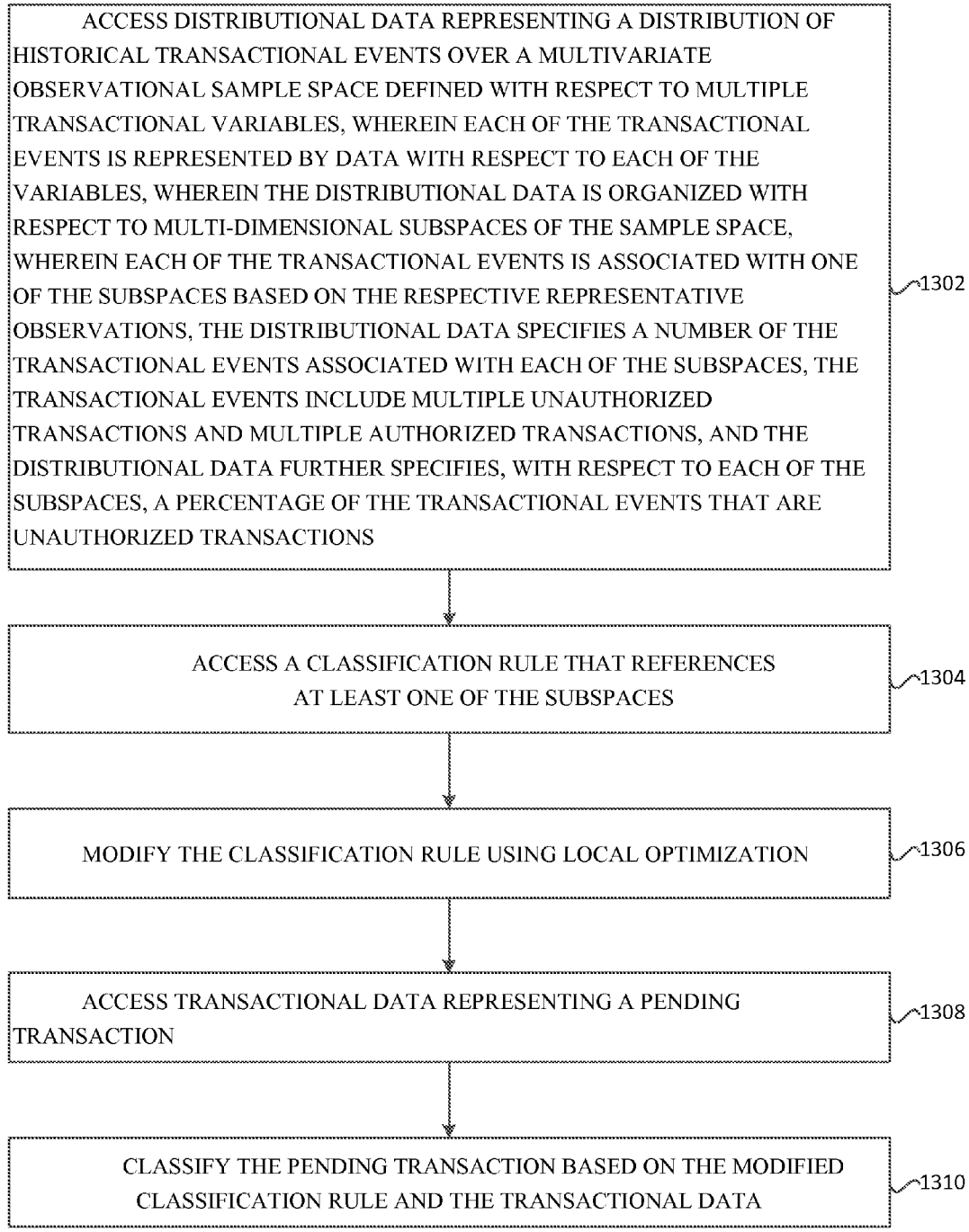
FIG. 13 is a flow diagram representing example fraud detection operations described in this disclosure.

FIG. 13 illustrates example operations of a fraud detection system, as described in this disclosure. At 1302, the fraud detection system accesses distributional data representing a distribution of historical transactional events over a multivariate observational sample space defined with respect to multiple transactional variables. Each of the transactional events is represented by data with respect to each of the variables, the distributional data is organized with respect to multi-dimensional subspaces of the sample space, and each of the transactional events is associated with one of the subspaces based on the respective representative observations. Moreover, the distributional data specifies a number of the transactional events associated with each of the subspaces, the transactional events include multiple unauthorized transactions and multiple authorized transactions, and the distributional data further specifies, with respect to each of the subspaces, a percentage of the transactional events that are unauthorized transactions.

At 1304, the fraud detection system accesses a classification rule that references at least one of the subspaces. At 1306, the fraud detection system modifies the classification rule using local optimization. At 1308, the fraud detection system accesses transactional data representing a pending transaction. At 1310, the fraud detection system classifies the pending transaction based on the modified classification rule and the transactional data.

The methods, systems, devices, implementations, and embodiments discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application. Also, a number of steps may be undertaken before, during, or after the above elements are considered. Accordingly, the above description does not bound the scope of the claims.

Any of the structures, abstractions, analysis, processing, gathering of data or other operations specifically mentioned or suggested herein may be implemented, performed, or used in any type of computing environment, regardless of size, location, speed or capabilities. For example, any or all of the disclosed components, systems and processes may be effectuated using a standalone computer architecture, or a distributed computing or data storage environment. Additionally, any or all of the disclosed components, systems and processes may be effectuated using any of the tools, constructs, software and mechanisms known within the Big Data community, including, for example, Hadoop, Mongo DB, Splunk.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop®, for example, is an open-source software framework for distributed computing.

The use of "capable of", "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A computer-program product tangibly embodied in a non-transitory machine-readable storage medium, the storage medium comprising stored instructions configured to cause a data processing apparatus to perform operations including:
    accessing distributional data representing a distribution of historical transactional events over a multivariate observational sample space defined with respect to multiple transactional variables, wherein a transactional event is represented by data corresponding to a variable, wherein the distributional data is organized with respect to multi-dimensional subspaces of the sample space, wherein:
        a transactional event is associated with a subspace based on one or more representative observations;
        the distributional data specifies a number of the transactional events associated with each of the subspaces;
        the transactional events include multiple unauthorized transactions and multiple authorized transactions; and
        the distributional data further specifies, with respect to each of the subspaces, a percentage of the transactional events that are unauthorized transactions;
    analyzing multiple candidate subspaces among the multi-dimensional subspaces of the sample space, wherein analyzing each of the candidate subspaces includes identifying a best one of the candidate subspaces, wherein the percentage specified with respect to the best one of the candidate subspaces is higher than the percentages specified for each of the other candidate subspaces;
    accessing a classification rule that references at least one of the subspaces including the best one of the candidate subspaces to define the classification rule;
    dynamically modifying the classification rule using local optimization applied using the distributional data;
    accessing transactional data representing a pending transaction on process; and
    classifying the pending transaction based on the modified classification rule and the transactional data.

2. The computer-program product of claim 1, wherein the instructions are further configured to cause the processing apparatus to use the local optimization, wherein the local optimization is based on the percentage specified with respect to each of the referenced subspaces and the number of the transactional events associated with each of the referenced subspaces.

3. The computer-program product of claim 1, wherein the instructions are configured to cause the processing apparatus to modify the classification rule wherein, after being modified, the classification rule references an additional one of the subspaces, and wherein the local optimization includes:
    analyzing the percentage specified with respect to each of the referenced subspaces and the number of the transactional events associated with each of the referenced subspaces; and
    analyzing the percentage specified with respect to at least one of the subspaces not referenced by the classification rule.

4. The computer-program product of claim 3, wherein the instructions are further configured to cause the processing apparatus to use the local optimization wherein the local optimization further includes:
    selecting one of the subspaces not referenced by the classification rule, wherein the selected subspace is selected based on analyzed percentages and numbers of transactional events, and wherein modifying the classification rule results in the classification rule further referring to the selected subspace.

5. The computer-program product of claim 4, wherein the instructions are further configured to cause the processing apparatus to select the subspace not referenced by the classification rule based on the number of transactional events associated with the subspace not referenced by the classification rule.

6. The computer-program product of claim 5, wherein the instructions are further configured to cause the processing apparatus to:
    identify the multiple candidate subspaces from amongst the subspaces not referenced by the classification rule, wherein identifying is based on a sample space location of each of the candidate subspaces relative to the selected subspace.

7. The computer-program product of claim 4, wherein the instructions are further configured to cause the processing apparatus to select the one of the subspaces based on a proximity of the one of the subspaces to the at least one of the subspaces referenced by the classification rule.

8. The computer-program product of claim 4, wherein the instructions are further configured to cause the processing apparatus to modify the classification rule by expanding a scope of the classification rule.

9. The computer-program product of claim 4, wherein the instructions are further configured to cause the processing apparatus to:
    determine a first weighted average, wherein the first weighted average is an average of the percentages specified with respect to each of the subspaces referenced by the classification rule, wherein the percentages are adjusted based on the number of transactional events associated with each of the subspaces referenced by the classification rule;
    evaluate a possible classification rule modification that would involve broadening the classification rule so that, in addition to the subspaces referenced by the classification rule, the classification rule would further reference the subspace not referenced by the classification rule; and
    determine a second weighted average, wherein the second weighted average is an average of the percentages specified with respect to each of the subspaces which would be referenced subsequent to effectuating the possible classification rule modification, wherein the percentages are adjusted based on the number of transactional events associated with each of the subspaces which would be referenced subsequent to effectuating the possible classification rule modification.

10. The computer-program product of claim 1, wherein subspaces represent a distribution of events in a historical sample, the events including at least one of an authorized or unauthorized event.

11. A computer-implemented method, comprising:
accessing distributional data on a computing device, the distributional data representing a distribution of historical transactional events over a multivariate observational sample space defined with respect to multiple transactional variables, wherein a transactional event is represented by data corresponding to a variable, wherein the distributional data is organized with respect to multi-dimensional subspaces of the sample space, wherein:
a transactional event is associated with a subspace based on one or more representative observations;
the distributional data specifies a number of the transactional events associated with each of the subspaces;
the transactional events include multiple unauthorized transactions and multiple authorized transactions; and
the distributional data further specifies, with respect to each of the subspaces, a percentage of the transactional events that are unauthorized transactions;
analyzing multiple candidate subspaces among the multi-dimensional subspaces of the sample space, wherein analyzing each of the candidate subspaces includes identifying a best one of the candidate subspaces, wherein the percentage specified with respect to the best one of the candidate subspaces is higher than of the percentages specified for each of the other candidate subspaces;
accessing a classification rule that references at least one of the subspaces including the best one of the candidate subspaces to define the classification rule;
dynamically modifying the classification rule using local optimization applied on a computing device, using the distributional data;
accessing transactional data representing a pending transaction on process; and
classifying the pending transaction based on the modified classification rule and the transactional data.

12. The method of claim 11, wherein the local optimization is based on the percentage specified with respect to each of the referenced subspaces and the number of the transactional events associated with each of the referenced subspaces.

13. The method of claim 11, wherein modifying the classification rule is wherein, after being modified, the classification rule references an additional one of the subspaces, and wherein the local optimization includes:
analyzing the percentage specified with respect to each of the referenced subspaces and the number of the transactional events associated with each of the referenced subspaces; and
analyzing the percentage specified with respect to one of the subspaces not referenced by the classification rule.

14. The method of claim 13, wherein the local optimization further includes:
selecting one of the subspaces not referenced by the classification rule, wherein the selected subspace is selected based on the analyzed percentages and numbers of transactional events, and wherein modifying the classification rule results in the classification rule further referring to the selected subspace.

15. The method of claim 14, wherein the selected subspace is further selected based on the number of transactional events associated with the selected subspace.

16. The method of claim 15, wherein the local optimization further includes:
identifying the multiple candidate subspaces from amongst the subspaces not referenced by the classification rule, wherein identifying is based on a sample space location of each of the candidate subspaces relative to the selected subspace.

17. The method of claim 14, wherein the candidate subspaces are selected based on a proximity of the candidate subspaces to the subspaces referenced by the classification rule.

18. The method of claim 14, wherein modifying the classification rule includes expanding a scope of the classification rule.

19. The method of claim 14, wherein the local optimization further includes:
determining a first weighted average, wherein the first weighted average is an average of the percentages specified with respect to each of the subspaces referenced by the classification rule, wherein the percentages are adjusted based on the number of transactional events associated with each of the subspaces referenced by the classification rule;
evaluating a possible classification rule modification that would involve broadening the classification rule so that, in addition to the subspaces referenced by the classification rule, the classification rule would further reference the subspace not referenced by the classification rule; and
determining a second weighted average, wherein the second weighted average is an average of the percentages specified with respect to each of the subspaces which would be referenced subsequent to effectuating the possible classification rule modification, wherein the percentages are adjusted based on the number of transactional events associated with each of the subspaces which would be referenced subsequent to effectuating the possible classification rule modification.

20. The method of claim 11, wherein subspaces represent a distribution of events in a historical sample, the events including at least one of an authorized or unauthorized event.

21. A system comprising:
a computer processor configured to perform operations including:
accessing distributional data representing a distribution of historical transactional events over a multivariate observational sample space defined with respect to multiple transactional variables, wherein a transactional event is represented by data corresponding to a variable, wherein the distributional data is organized with respect to multi-dimensional subspaces of the sample space, wherein:
a transactional event is associated with a subspace based on one or more representative observations;
the distributional data specifies a number of the transactional events associated with each of the subspaces;
the transactional events include multiple unauthorized transactions and multiple authorized transactions; and
the distributional data further specifies, with respect to each of the subspaces, a percentage of the transactional events that are unauthorized transactions;
analyzing multiple candidate subspaces among the multi-dimensional subspaces of the sample space, wherein analyzing each of the candidate subspaces includes identifying a best one of the candidate subspaces, wherein the percentage specified with respect to the best one of the candidate subspaces is higher than the percentages specified for each of the other candidate subspaces;

accessing a classification rule that references at least one of the subspaces including the best one of the candidate subspaces to define the classification rule;

dynamically modifying the classification rule using local optimization applied using the distributional data;

accessing transactional data representing a pending transaction on process; and classifying the pending transaction based on the modified classification rule and the transactional data.

22. The system of claim 21, wherein the processor is configured to perform the local optimization based on the percentage specified with respect to each of the referenced subspaces and the number of the transactional events associated with each of the referenced subspaces.

23. The system of claim 21, wherein the processor is configured to modify the classification rule wherein, after being modified, the classification rule references an additional one of the subspaces, and wherein the processor is configured to perform the local optimization by:

analyzing the percentage specified with respect to each of the referenced subspaces and the number of the transactional events associated with each of the referenced subspaces; and analyzing the percentage specified with respect to one of the subspaces not referenced by the classification rule.

24. The system of claim 23, wherein the processor is configured to perform the local optimization by further:

selecting one of the subspaces not referenced by the classification rule, wherein the selected subspace is selected based on the analyzed percentages and numbers of transactional events, and wherein modifying the classification rule results in the classification rule further referring to the selected subspace.

25. The computer-program product of claim 24, wherein further, the processor is configured to perform the local optimization wherein the selected subspace is further selected based on the number of transactional events associated with it.

26. The system of claim 25, wherein the processor is further configured to:

identify the multiple candidate subspaces from amongst the subspaces not referenced by the classification rule, wherein identifying is based on a sample space location of each of the candidate subspaces relative to the selected subspace.

27. The system of claim 24, wherein the processor is configured to select the multiple candidate subspaces based on a proximity of the candidate subspaces to the subspaces referenced by the classification rule.

28. The system of claim 4, wherein the processor is configured to modify the classification rule, wherein modifying the rule expands a scope of the classification rule.

29. The system of claim 24, wherein the processor is further configured to perform the local optimization so as to include:

determining a first weighted average, wherein the first weighted average is an average of the percentages specified with respect to each of the subspaces referenced by the classification rule, wherein the percentages are adjusted based on the number of transactional events associated with each of the subspaces referenced by the classification rule;

evaluating a possible classification rule modification that would involve broadening the classification rule so that, in addition to the subspaces referenced by the classification rule, the classification rule would further reference the subspace not referenced by the classification rule; and determining a second weighted average, wherein the second weighted average is an average of the percentages specified with respect to each of the subspaces which would be referenced subsequent to effectuating the possible classification rule modification, wherein the percentages are adjusted based on the number of transactional events associated with each of the subspaces which would be referenced subsequent to effectuating the possible classification rule modification.

30. The system of claim 21, wherein subspaces represent a distribution of events in a historical sample, the events including at least one of an authorized or unauthorized event.

* * * * *